(12) United States Patent
Ginocchio

(10) Patent No.: US 8,635,750 B1
(45) Date of Patent: Jan. 28, 2014

(54) SELF-ALIGNING HANDLING OR STORING DEVICE

(76) Inventor: Mark H. Ginocchio, St. Petersburg Beach, FL (US)

( * ) Notice: Subject to any disclaimer, the term of this patent is extended or adjusted under 35 U.S.C. 154(b) by 432 days.

(21) Appl. No.: 12/794,481

(22) Filed: Jun. 4, 2010

(51) Int. Cl.
*F16B 2/02* (2006.01)

(52) U.S. Cl.
USPC ............. 24/484; 24/272; 24/30.5 R; 24/517; 70/16

(58) Field of Classification Search
USPC ..... 24/272, 484, 16 R, 505, 506, 16 PB, 517, 24/30.5 R; 70/16
See application file for complete search history.

(56) References Cited

U.S. PATENT DOCUMENTS

| | | | |
|---|---|---|---|
| 151,452 A | 5/1874 | Tower | |
| RE7,873 E | 9/1877 | Phelps | |
| 200,950 A | 3/1878 | Tower et al. | |
| 222,751 A | 12/1879 | Tower et al. | |
| 470,869 A | 3/1892 | Kahlke | |
| 609,989 A | * 8/1898 | Hoglund | 24/30.5 R |
| 636,589 A | 11/1899 | Tower | |
| 686,626 A | 11/1901 | Maltby | |
| 732,417 A | 6/1903 | Judd | |
| 766,263 A | 8/1904 | Judd | |
| 772,468 A | 10/1904 | Maltby | |
| 827,385 A | 7/1906 | Olcott | |
| 870,871 A | 11/1907 | Eggleton | |
| 929,910 A | 8/1909 | Wood | |
| 930,014 A | 8/1909 | Wood | |
| 948,310 A | 2/1910 | Caveney | |
| 985,560 A | 2/1911 | Widmayer | |
| 1,000,666 A | 8/1911 | Caveney | |
| 1,014,118 A | 1/1912 | Carberry | |
| 1,038,492 A | 9/1912 | Lorey | |
| 1,806,163 A | * 5/1931 | Hoglund | 70/16 |
| 3,146,614 A | 9/1964 | Von Frantzius | |
| 3,310,852 A | 3/1967 | Flanders | |
| 3,429,985 A | 2/1969 | Czigler | |
| 3,530,543 A | 9/1970 | Desmarais et al. | |
| 3,574,900 A | 4/1971 | Emery | |
| 3,654,668 A | 4/1972 | Appleton | |
| 3,660,869 A | 5/1972 | Caveney et al. | |
| 3,910,280 A | 10/1975 | Talonn | |

(Continued)

FOREIGN PATENT DOCUMENTS

| | | |
|---|---|---|
| GB | 758160 A | 10/1956 |
| GB | 1224535 A | 3/1971 |
| GB | 2139016 A | 10/1984 |
| GB | 2245639 A | 1/1992 |

OTHER PUBLICATIONS

Sumitomo Wiring System, Ltd., Binding Tool for Wire Harness, Patent Abstracts of Japan, Pub. No. 07122135, Oct. 21, 1993.

*Primary Examiner* — Robert J Sandy
*Assistant Examiner* — Michael Lee
(74) *Attorney, Agent, or Firm* — Wood, Herron & Evans, LLP

(57) ABSTRACT

A device for handling or storing one or more items, has a pair of generally rigid jaw members each having a hinge end and an outer end. The jaw members have a first, open position in which the outer ends are spaced apart to define a receiving space and a plurality of closed positions. The jaw members are self aligned and one of them has an engagement member to engage the other. The engagement member is separate from either jaw member, and may therefore be made of a different material.

9 Claims, 24 Drawing Sheets

(56) References Cited

U.S. PATENT DOCUMENTS

| | | |
|---|---|---|
| 3,953,911 A | 5/1976 | Fishack |
| 4,123,095 A | 10/1978 | Stehlin |
| 4,278,042 A | 7/1981 | Lindquist |
| 4,340,998 A | 7/1982 | Liberge |
| 4,361,938 A | 12/1982 | Emery |
| 4,380,101 A | 4/1983 | Joubert et al. |
| 4,483,556 A | 11/1984 | LiVolsi |
| 4,511,164 A | 4/1985 | Orchard |
| 4,650,925 A | 3/1987 | Coldren |
| 4,669,688 A | 6/1987 | Itoh et al. |
| 4,870,722 A | 10/1989 | Shell, Jr. |
| 4,956,897 A | 9/1990 | Speedie |
| 4,958,791 A | 9/1990 | Nakamura |
| 4,991,265 A | 2/1991 | Campbell et al. |
| 5,056,248 A | 10/1991 | Blanchard |
| 5,083,741 A | 1/1992 | Sancoff |
| 5,210,911 A | 5/1993 | Brown et al. |
| 5,228,174 A | 7/1993 | Beasley |
| 5,317,788 A | 6/1994 | Esposito et al. |
| 5,349,779 A | 9/1994 | Ben-Dror |
| 5,377,510 A | 1/1995 | Smith |
| 5,729,872 A | 3/1998 | Ginocchio |
| 5,794,461 A | 8/1998 | Smith |
| 6,101,684 A | 8/2000 | Ginocchio |
| 6,196,033 B1 | 3/2001 | Dowdle |
| 6,619,077 B1 | 9/2003 | Robinson |
| 6,742,223 B1 * | 6/2004 | Chang ............................ 24/16 R |
| 7,900,324 B2 * | 3/2011 | Ginocchio ....................... 24/272 |
| 8,246,095 B2 * | 8/2012 | Radle et al. .................... 294/165 |
| 8,328,458 B2 * | 12/2012 | Werth ............................ 403/289 |
| 2009/0211063 A1 * | 8/2009 | Ginocchio ....................... 24/270 |
| 2010/0201144 A1 | 8/2010 | Radle et al. |

* cited by examiner

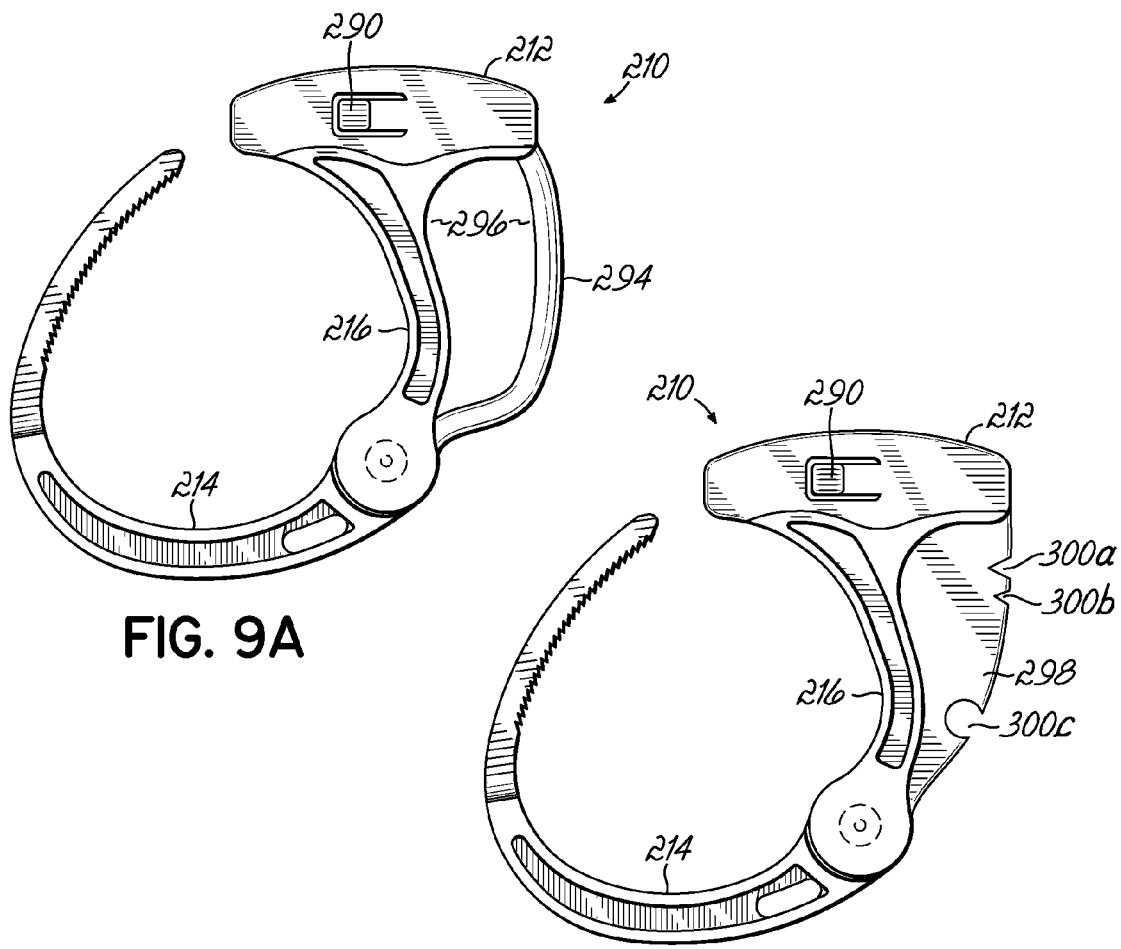
FIG. 9A
FIG. 9B
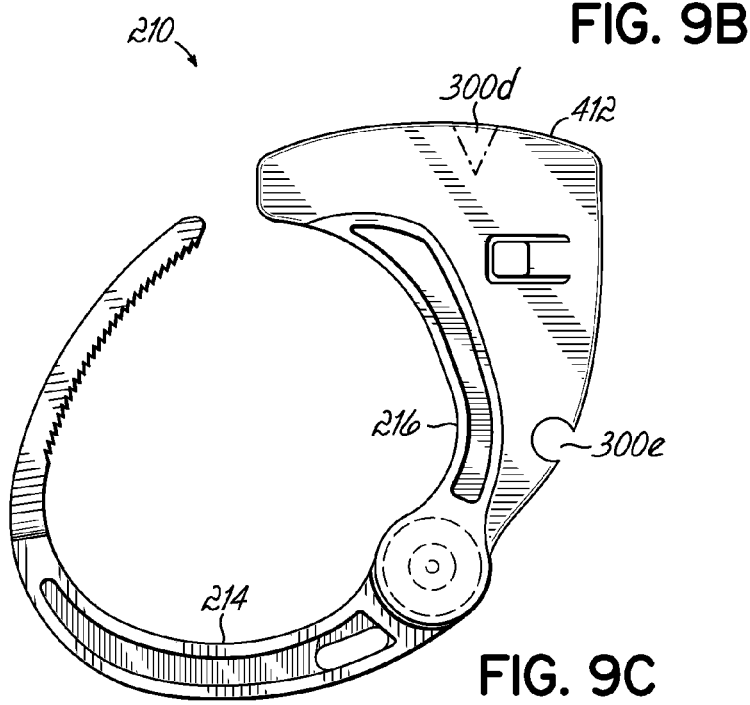
FIG. 9C

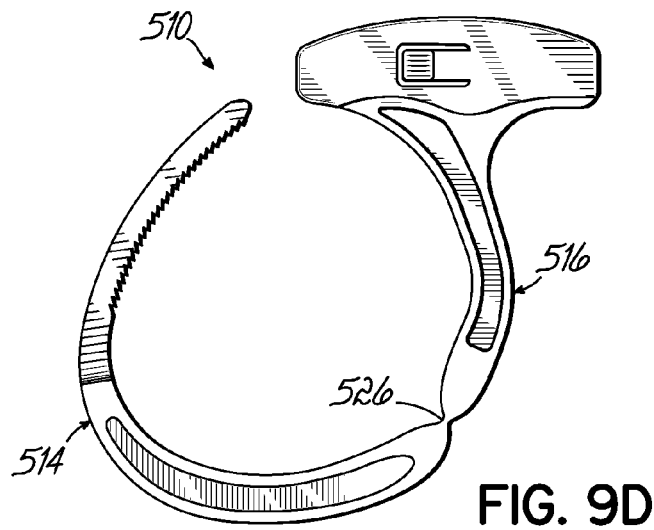
FIG. 9D
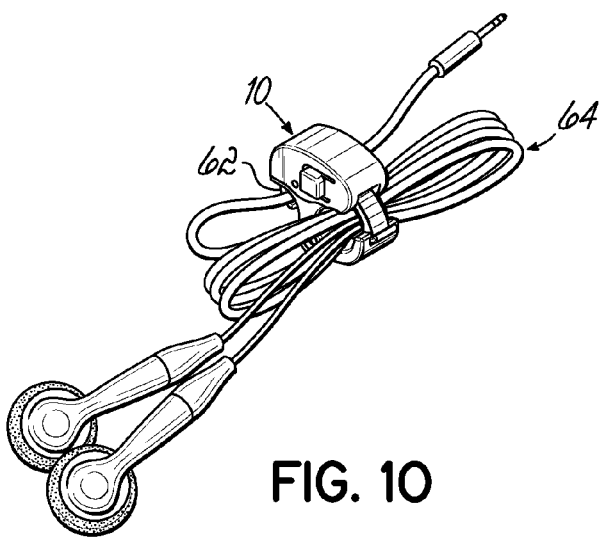
FIG. 10
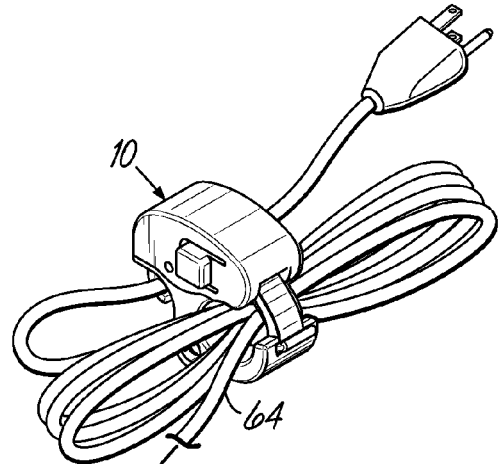
FIG. 11
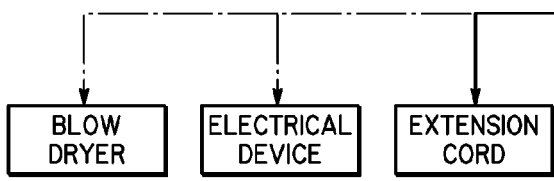

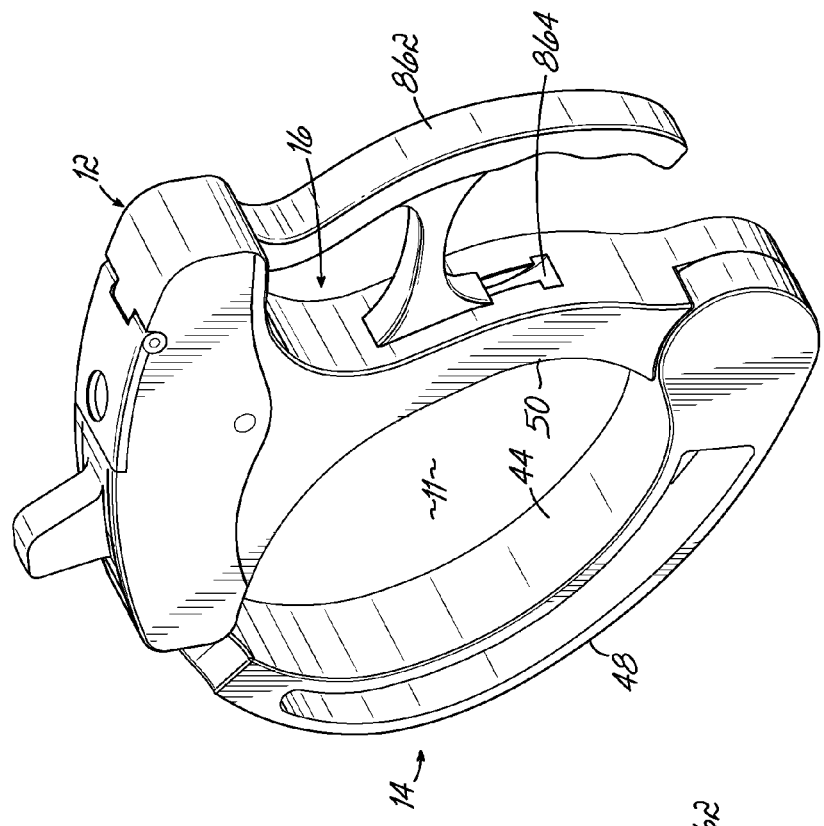
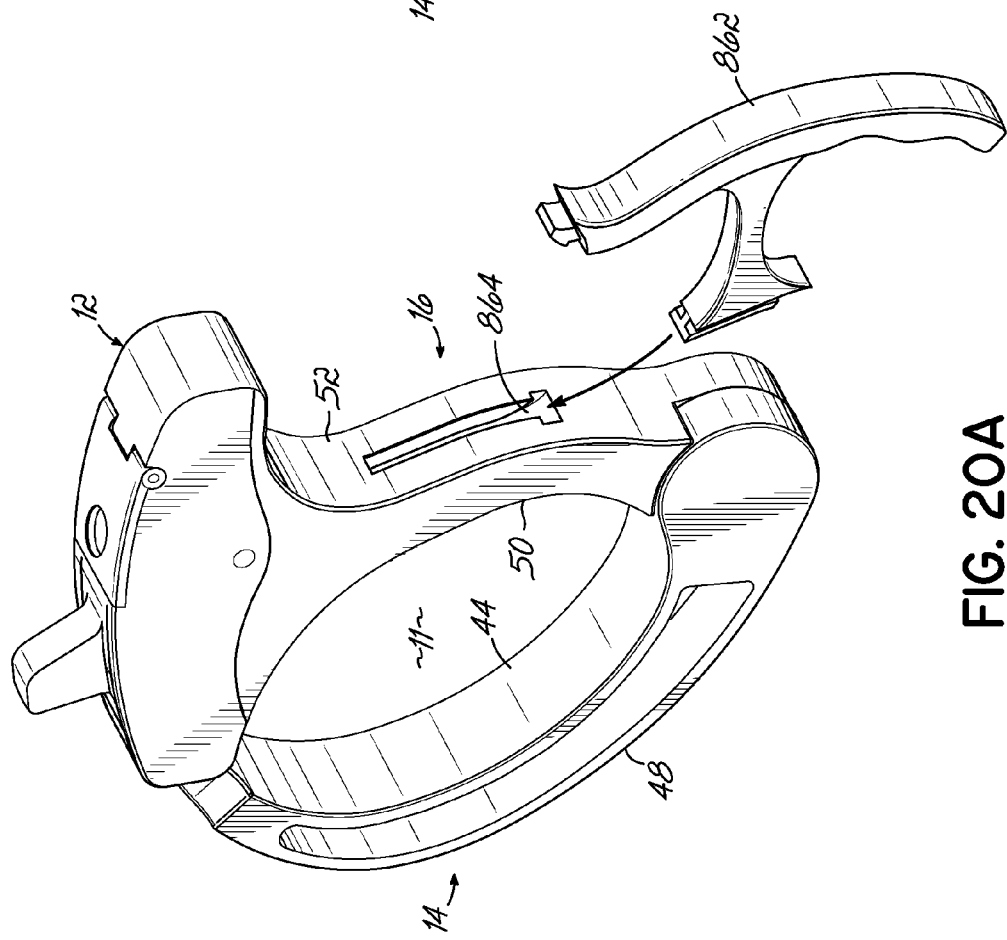
FIG. 20B
FIG. 20A

SELF-ALIGNING HANDLING OR STORING DEVICE

RELATED APPLICATION

This application is related to application U.S. Ser. No. 12/038,514 filed Feb. 27, 2008 and U.S. Pat. Nos. 5,729,872 and 6,101,684, each naming the same inventor as the present application, all three of which are hereby incorporated by reference in their entireties. This application is related to application Ser. Nos. 12/794,474 and 12/794,417 concurrently herewith.

FIELD OF THE INVENTION

The present invention relates to devices for capturing items, such as for handling or storage of electrical cords or cables or other applications.

BACKGROUND OF THE INVENTION

Handling and/or storage of items has presented numerous challenges, and despite the various handling and storage devices that have been devised, several problems continue to be difficult to resolve.

One example is the problem of storage of electrical cords or cables. Many people tend to leave their cords simply in a pile. Such an approach is unsightly and can be unsafe. Indeed, without better organization of the cords, storage can become a nightmare. One need only consider the PC laptop user trying to untangle the mess of cables from the briefcase in a busy airport.

Typically, wire-ties, tie wraps, cable ties, or twist-ties may be used to store cords in an effort to reduce such problems. However, such items are very difficult to use and require a great deal of manual dexterity. In particular, closing these ties around the bundled cord is quite challenging because the ends are free to go wherever they are pushed. Some of those items, and particularly twist-ties such as are used to close garbage bags, are unsightly, have only a short useful life, and can present a risk of injury due to the metal wire contained therein. Other cable management devices have been proposed, but they are usually quite bulky and again require a great deal of manipulation. By way of example, some cable management devices are molded into a split ring with the ends normally urged together. The ends may be temporarily held apart by the user while a cable is inserted into the device. Such a device is difficult to load with the bundled wire because the ends are normally urged together into a closed or nearly-closed position. The ends may be temporarily held apart by the user while a cable is inserted into the device. Such a device is difficult to load with the bundled wire because the ends are normally urged together into a closed or nearly-closed position.

When not attached to a cable or wire, a small wire tie or similar device is easy to lose. Also, such devices are typically designed for limited use, e.g., they cannot be non-destructively removed, or will experience substantial wear (e.g., metal fatigue) if repeatedly opened and closed. Thus, one cannot avoid losing a twist tie or wire tie by attaching it to the unbundled cable, since doing so will require destruction or damage to the twist tie or wire tie. This is a particular drawback in storage of cables which must be repeatedly bundled and unbundled, e.g., extension cords used with hand tools, portable computer cabling, and other similar applications.

Aside from bundles of wires, in various other situations, objects must be wrapped and held for storage, handling or other reasons; often wire ties, twist ties, or lengths of string are used in such situation, with unsatisfactory results for the same reasons as those noted above: difficulty in use, likelihood of loss, and destruction and wear resulting from repeated use.

Recent patents by the present inventor, U.S. Pat. Nos. 5,729,872 and 6,101,684, which are hereby incorporated by reference in their entirety, have improved upon the situation described above by introducing handcuff-like elements having a pair of jaws that can self-sustain an open position while a bundled item is inserted, and then the jaws follow a fixed path or trajectory to close and latch around the bundled item. These devices are unlatched by generally pulling against a force generated by a living hinge or spring that keeps the two jaws engaged at their latching ends. This pulling action can be difficult and inconvenient depending upon the orientation, size, and location of the bundle. The person using the existing devices may have to locate and orient their bundles in a way that can accommodate the needed access for unlatching even though they would prefer a different orientation or location.

Accordingly, there is a need for a device that can be released with a different motion and/or direction than is currently available without suffering the drawbacks noted above.

There is also a need for a device that is usable on a very small bundle, such as the wires leading to earbuds for portable entertainment devices. Earbuds, need only use a very small device since earbuds use a very thin wire. Devices such as those of U.S. Pat. Nos. 5,729,872 and 6,101,684 could benefit the user of earbuds if they could be made in very small sizes, but their unlatching actions tend to limit how small they can go and still be easily used by the human hand. Therefore, a different unlatching action, able to be used when incorporated into a small device, is a desirable improvement.

SUMMARY OF THE INVENTION

In one aspect, the invention features a device for handling or storing one or more items. The device has a pair of generally rigid first and second jaw members each having a hinge end and an outer end, each jaw member including an inner surface and an outer surface. The jaw members are connected together at their hinge ends, such that the jaw members (i) have an open position in which the outer ends are spaced apart to define a receiving space and the inner surfaces are generally not facing one another, (ii) having many closed positions and (iii) are self aligned.

An engagement device coupled to the outer end of one jaw member engages the outer surface of the other jaw member. The engagement device is made of a first kind of material, in one piece, and has a pawl portion, a beam portion, and an anchor portion. The pawl portion includes a release member that is moveable toward the hinge ends of the jaw members to move the pawl portion between an engaging and a disengaged position by resilient flexing of the beam portion. The beam portion is also sometimes referred to as a flexor.

The first jaw and the second jaw are made of at least one second material that is different than material that the engagement device is made of.

These and other features, objects and advantages of the invention will become more readily apparent to those skilled in the art in view of the following detailed description, taken in conjunction with the accompanying drawings.

BRIEF DESCRIPTION OF THE DRAWINGS

The accompanying drawings, which are incorporated in and constitute a part of this specification, illustrate embodiments of the invention and, together with a general description of the invention given above, and the detailed description given below, serve to explain the principles of the invention.

FIG. 9A is an elevational view of an embodiment with an open surface handle.

FIG. 9B is an elevational view of an embodiment with a closed surface handle.

FIG. 9C is an embodiment with a closed surface handle with side buttons at the handle area.

FIG. 9D is an elevational view of an embodiment with a hinge strap, sometimes known as a "living hinge".

FIG. 10 is a perspective view of an embodiment clipped to a set of earbuds and bundling them.

FIG. 11 is a perspective view of an embodiment clipped to an extension cord, and alternately a blow dryer or another electrical device.

FIGS. 20A and 20B illustrate an embodiment having a removable handle, and the hinged mount in its retracted position.

DETAILED DESCRIPTION OF THE INVENTION

Figure 1:
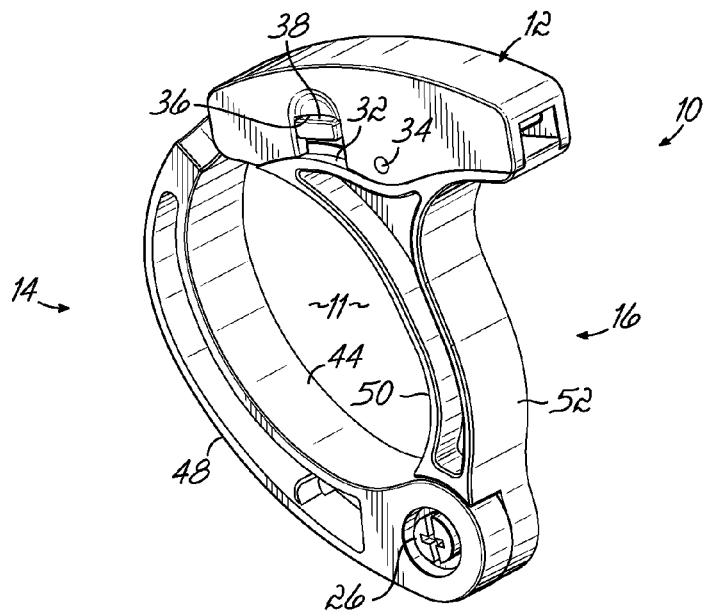
FIG. 1 is a perspective view of one of the embodiments of the invention.

With reference to FIGS. 1, 2, 2A, and 2B there is shown a handcuff-like element 10 having an interior area 11, a cap 12, and a pair of generally rigid jaw members 14 and 16 each having a proximal hinge end 18, 20 and a distal attachment end 22, 24. Hinge ends 18, 20 are directly connected together and held by a screw 26 or a similar fastening device that may act as an axle. Additionally, or instead of the screw 26 acting as an axle, an inside cylindrical surface 28 and an outside cylindrical surface 30 along with appropriate snap fit confronting faces or shoulders, may create an accurate axle system. The axle system causes jaw members 14 and 16 to self align relative to one another when they are pivoted between the self sustaining wide open position (FIG. 2A) and the closed position shown in FIGS. 1 and 2C that encloses the interior area 11. Alternately, as illustrated in FIG. 9D, a hinge strap, also known as a "living hinge" may be used in place of the axle system to similarly cause the jaws to self align when closed.

Cap 12 rests on shoulder 32 of jaw member 16 and is held in place by a pin 34 through holes as shown in cap 12 and jaw member 16, but cap 12 could be attached by other methods, for example gluing or ultrasonic welding. On each side face of the cap are apertures 36 that are in line with two release tabs 38 that will be described below.

The cap 12 creates a passageway 40 (FIG. 2B) having a retaining surface 42 for guiding the attachment end 22. Although jaws 14 and 16 are self aligning, and so retaining surface 42 is not required to guide attachment end 22 into a closed position, the retaining surface 42 aids in maintaining a latched condition by its close proximity to attachment end 22, so that retaining surface 42 opposes flexing of attachment end 22 outwardly, such as might occur under forces from a bundle retained by jaw 14. The "outwardly directed forces" would be most prevalent, for instance, if a person captured an oversized bundle of cord, preventing the device 10 from closing past just a few teeth of engagement, and thus the bundle exerts a force against the tooth portion of jaw 14 that may tend to open the jaws. The details of opening and closing of the jaws will be explained later. The outwardly directed forces would be a particular problem, if an oversized bundle were to receive an additive force such as by bumping or dropping of the bundle and device 10. This embodiment of the device 10 could function in most circumstances even if cap 12 were not present, although it may not remain latched as well under the situations just described.

Jaw member 14 has a generally smooth retaining surface 44 and fixed teeth 46 on the inner surfaces and an outer press area 48 on the outer surface. Although smooth surfaces are shown in the FIGS., it will be appreciated that teeth 46 or other non-smooth features may extend along all of jaw member 14, in other embodiments, such that there is not a smooth surface 44.

Jaw member 16 has a generally smooth retaining surface 50 near its hinge end, an outer press area 52 on the outer surface, and a pawl 54 on its attaching end 24. The pawl has deflecting teeth 56 and the horizontal release tabs 38 on each side. The fixed teeth 46 and the deflecting teeth 56 are sized to interlock. Both sets of teeth 46, 56 may be backward angled as seen most clearly in FIG. 2D, to enhance their ability to pass over each other in the closing direction, but resist movement in the opening direction. Although multiple teeth 56 are shown in the drawings, a single tooth may perform the desired function satisfactorily. As seen most clearly in FIG. 2D, the pawl is at the end of a resilient cantilever portion 58 so that downward force on the top surface of release tab 38, will cause the deflecting teeth 56 to move towards the interior of the device 10. It should be noted that there are two release tabs 38 but a force on just one of them will deflect the teeth inwardly.

Figure 2:
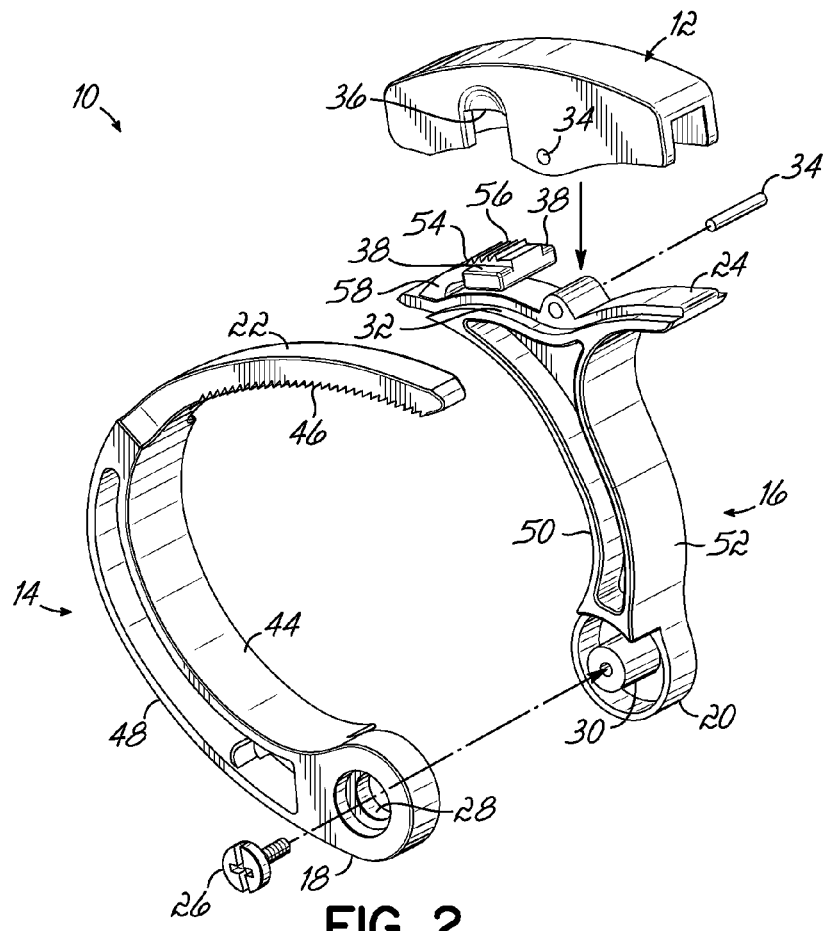
FIG. 2 is an exploded perspective view of the embodiment of FIG. 1.
Figure 2A:
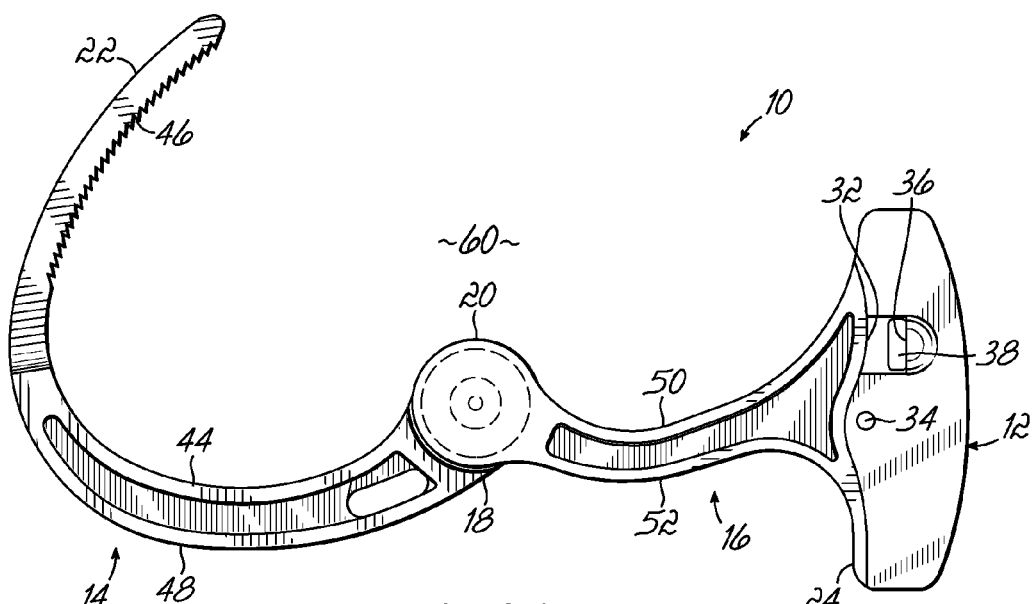
FIG. 2A is a side view, of the embodiment of FIG. 1 in an unlatched and open condition ready to receive a bundle.
Figure 2B:
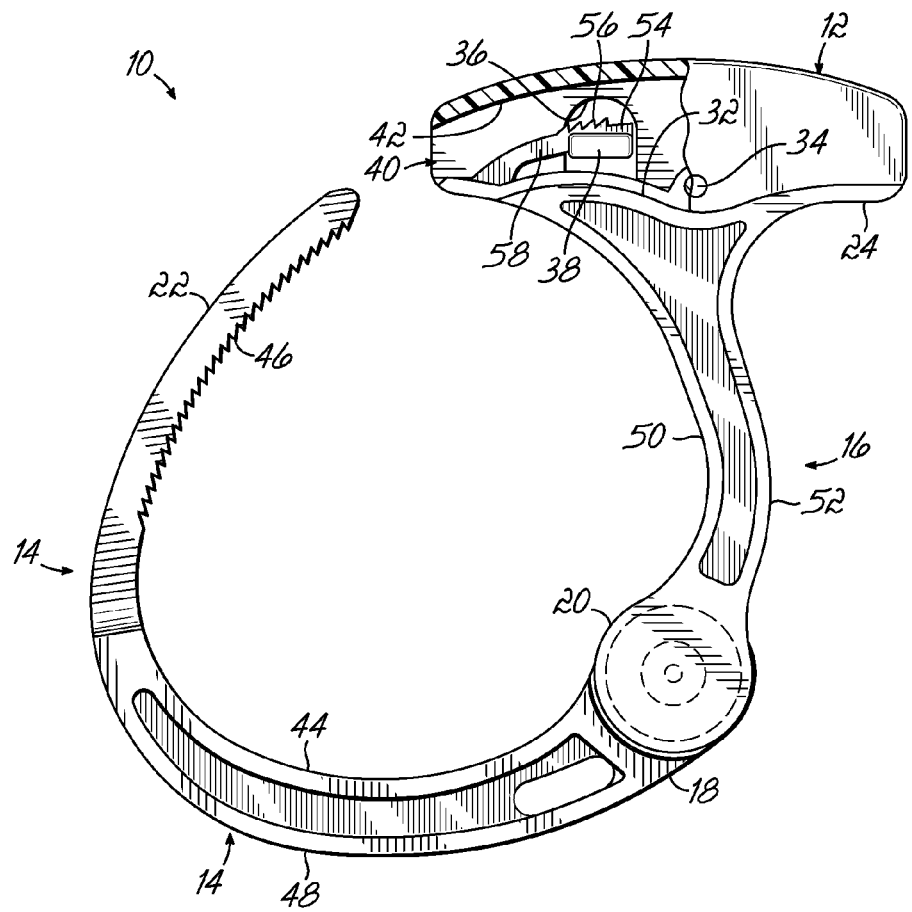
FIG. 2B is a side view with cutaway, of the embodiment of FIG. 1 in an unlatched and open condition.
Figure 2C:
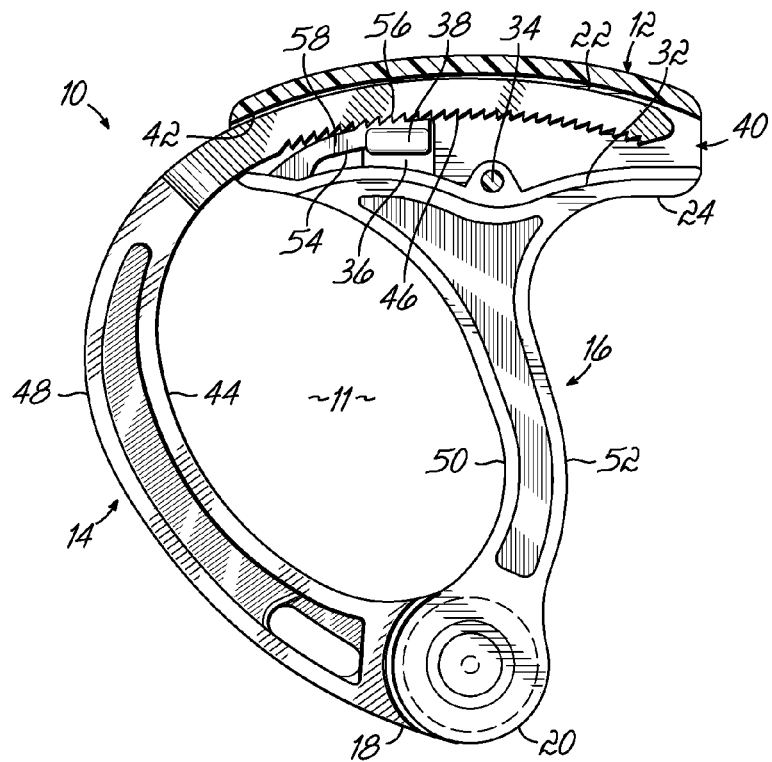
FIG. 2C is a side view with cutaway, of the embodiment of FIG. 1 in a latched condition.

In operation, as with some other handcuff like devices used for bundling, the device is put in the fully open position so that the retaining surfaces 44 and 50 define a bundle receiving space 60 (FIG. 2A). The device will remain in this position without any assistance, while the bundled item is placed in the space 60. Once the bundle is positioned, the user presses on outer press surfaces 48 and 52 to close the device. During the closing the attachment end 22 enters passageway 40 and the fixed teeth 46 make contact with and pass over the teeth 56 (best seen in FIGS. 2C and 2D) while the pawl 54 flexes as teeth 46 pass over deflecting teeth 56.

Figure 2D:
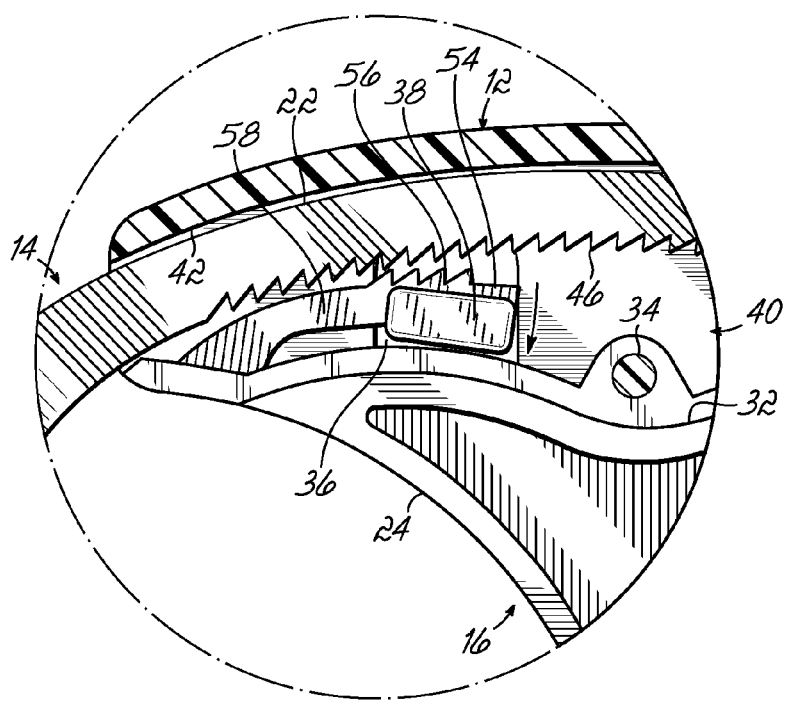
FIG. 2D is a detail cutaway of the embodiment of FIG. 2B at the beginning of the unlatching process.

FIG. 2D demonstrates the initiating actions to open the device. The exposed (as seen exposed in FIG. 1) release tab portion 38 is pushed in the direction indicated by the arrow toward the interior of the device, such as with a fingernail, so that the deflecting teeth 56 disengage from the fixed teeth 46 and then the jaw member 14 is removed from passageway 40 before the pressure is removed from tab 38. It is only necessary to use one of the two release tabs 38, thus, the device is operable even if access to one of the tabs is blocked, such as by a neighboring wall, a computer rack, or anything nearby.

Figure 3A:
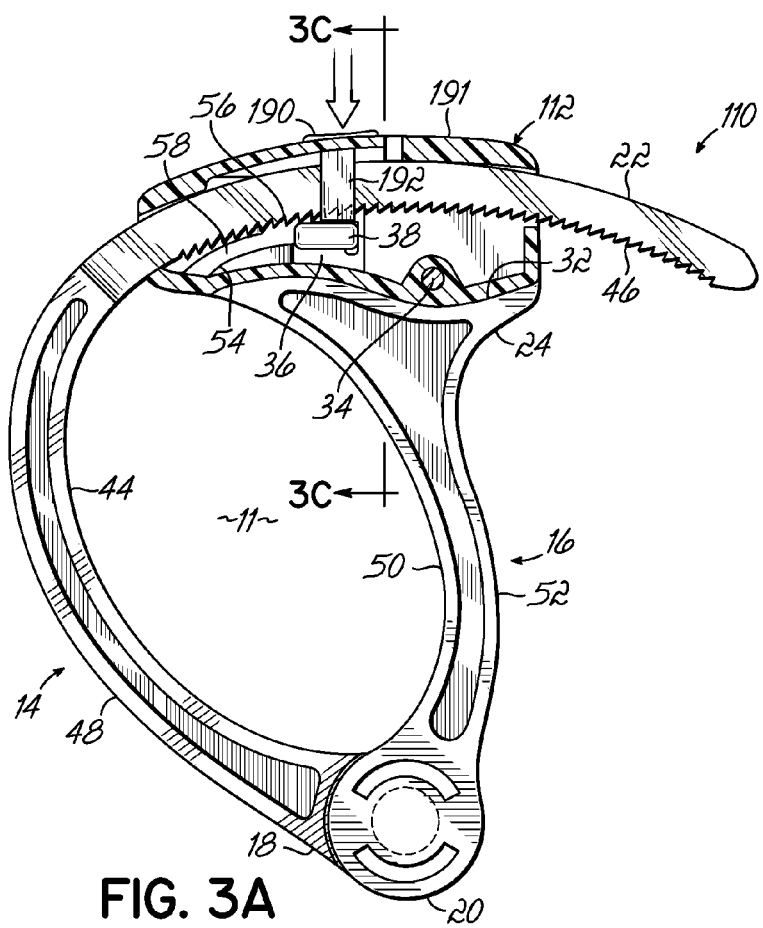
FIG. 3A is a side view with a cutaway, of an embodiment of the invention that is actuated by a central top button, shown in the latched condition.
Figure 3B:
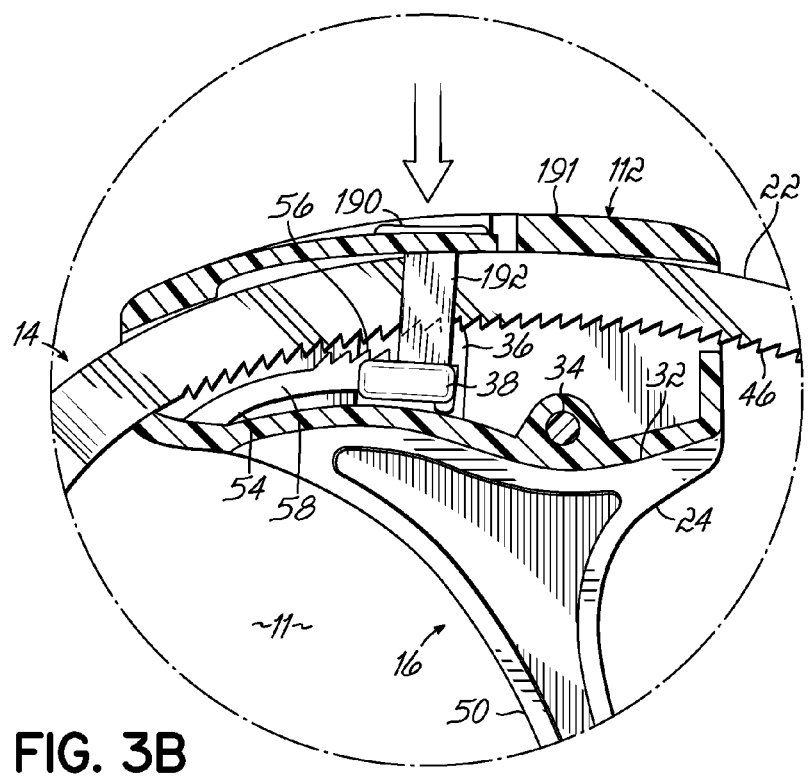
FIG. 3B is a detail side cutaway view of the embodiment of FIG. 3A at the beginning of the unlatching process.

The embodiment of a device 110 shown in FIGS. 3A and 3B may be built with all of the same parts as the previous embodiment, except for using a different cap. Whereas cap 12 of the previous figures allowed the device to open only through the use of the two release tabs 38, cap 112 of this embodiment additionally offers the user a button or spot 190 resiliently cantilevered as part of the cap's top surface 191. Inside of the cap (see FIGS. 3C, 3D and 3E), integral to the push button are two tabs 192 that pass near the inside wall of the cap 112, so that when the button 190 is depressed the two tabs 192 make contact with the two release tabs 38 resulting in the same releasing motion that would be provided by one or both release tabs being depressed directly.

FIG. 3A shows the device 110 in the latched condition with the teeth 56 on the pawl 54 in their raised position, interlocked with teeth 46. The button 190 is approximately flush with the top surface 191 of the cap 112. The arrow indicates the direction of movement to press button 190 to initiate unlatching.

FIG. 3B shows button 190 being pushed toward the interior of the device 110, and tabs 192 are in contact with release tabs 38. Pawl 54 is deflected toward the interior of the device under the pressure from tabs 192, which causes teeth 56 to move toward the interior of the device, and disengage from teeth 46 so that jaw member 14 can be removed from passageway 40 to complete unlatching.

Figure 3C:
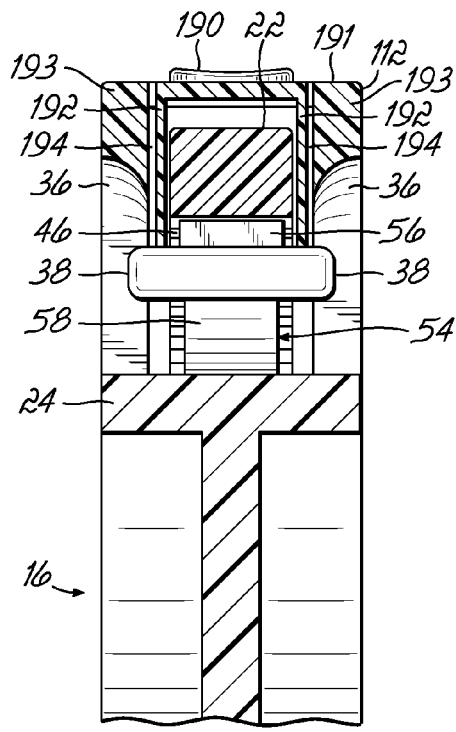
FIG. 3C is a cross sectional view of the embodiment of FIGS. 3A and 3B.

FIG. 3C is a cross sectional view of the device 110 of FIGS. 3A and 3B. It is latched as in FIG. 3A. This cross sectional view shows two tabs 192, apertures 36, and release tabs 38 whereas only one of each is visible in the preceding views. FIG. 3C also shows the relative thickness of the sidewalls 193 of cap 112, and the apertures 36 providing space for the release tabs 38. Spaces 194 between tabs 192 and the sidewalls of cap 112 are visible. Teeth 46 and 56 are interlocked since the device 10 is shown latched.

Figures 3D, 3E:
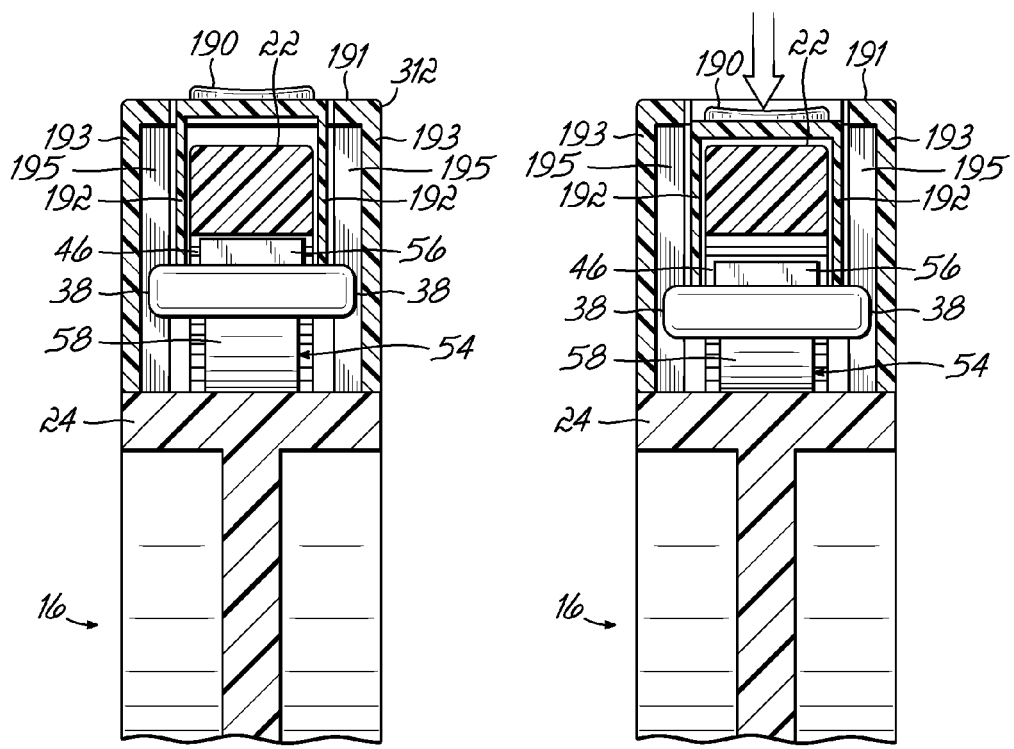
FIG. 3D is a cross sectional view similar to FIG. 3C showing an embodiment that does not have access to release tabs, in the latched condition.
FIG. 3E is a view of the embodiment of FIG. 3D, with the unlatching process having begun.

FIG. 3D is a cross sectional view similar to FIG. 3C but of an alternative embodiment. Again this figure shows the embodiment in a latched condition. In this embodiment there is a cap 312 that does not have any apertures 36 to provide access to release tabs 38, that is, cap 312 fully encloses release tabs 38. The only means provided for opening the device is the button or spot 190 on the cap's top surface 191. Release tabs 38 are accommodated inside cap 312 by two vertical channels 195 inside the cap 312 defined by reduced thickness of the sidewall 193 of the cap 312 in the area of the release tabs 38. Optionally, changes may also be made to reduce the extension of release tabs 38, since it is not necessary for a finger or fingernail to make contact with release tabs 38 in this embodiment, although changes to the extensions of release tabs 38 are not necessary if channels 195 are provided.

FIG. 3E illustrates the embodiment of FIG. 3D, with an arrow showing the directions the button 190 may be pushed to initiate unlatching. Pawl 54 has been deflected, and teeth 46 and 56 are disengaged so that the device can be opened in the same way as previously described for other embodiments.

Although this embodiment shows the pawl 54 being actuated by release tabs 38 being contacted by tabs 192 integral with and approximately directly below button 190, other embodiments could be made that move the tabs 192 and button 190 to different positions. This change, however, may require that the embodiment of FIGS. 3D-3E would use different jaw members 16, unless jaw member 16 was made to accommodate multiple positions of tabs 192.

FIGS. 4, 5, 6A and 6B show another embodiment, a device 210 that combines advantageous aspects from two previously described embodiments. The three digit numbers used in this embodiment with like ending digits designate similar elements as the numbers in the previous embodiments. This embodiment has two side pushbuttons 290 cantilevered in the side surface of a cap 212 which are actuated for unlatching by pushing either one, or both, of the two available buttons 290 on cap 212. Although the appearances of jaw members 214 and 216 look substantially different in this embodiment when compared to earlier figures having jaw members 14 and 16, many of the visual differences are a matter of styling or related to the fact that this embodiment shows how the device would look if it were sized for a small bundle, such as for a set of earbud cables as used on small digital music devices that are currently common. Functionally, however, jaw member 214 remains the same, whereas jaw member 216 is changed to accommodate the two side buttons 290.

Figure 4:
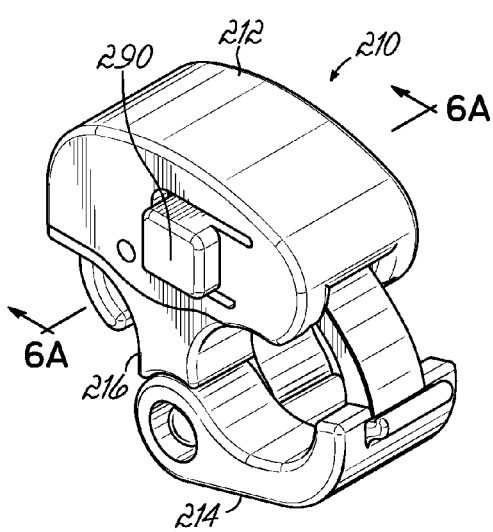
FIG. 4 is a perspective view of another embodiment of the invention in the latched condition. This embodiment has 2 side buttons.
Figure 5:
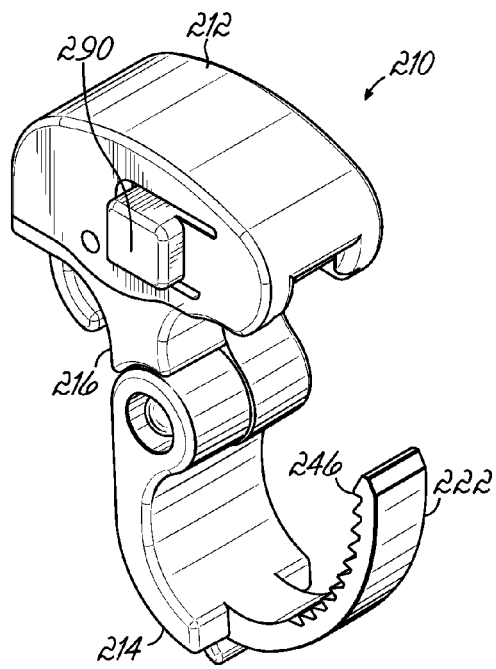
FIG. 5 is a perspective view of the embodiment of FIG. 4 in the unlatched condition.
Figure 6A:
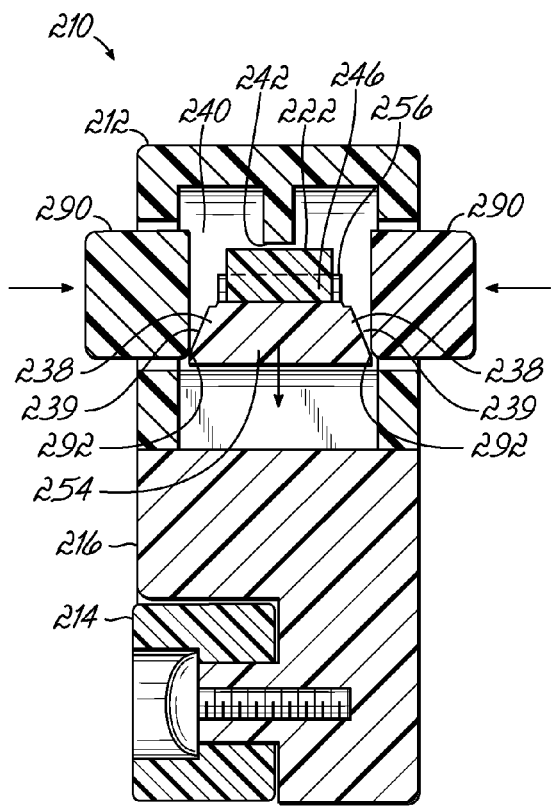
FIG. 6A is a cross section as indicated in FIG. 4, with arrows showing the direction of motion necessary to unlatch.

FIG. 6A is a cross section showing the device 210 in the latched position, analogous with FIG. 4. Cap 212 defines a passageway 240 that defines on its surface a retaining surface 242. Jaw member 214 has attaching end 222 and teeth 246. Jaw member 216 has pawl 254, deflecting teeth 256, and tabs 238. Teeth 246 are interlocked with teeth 256. Tabs 238 do not have a top face as did release tabs 38, but instead have angled side faces 239. The reason for these angled side faces can best be understood by describing the unlatching actuation as follows.

Two arrows in FIG. 6A show the buttons 290 being depressed towards the pawl 254 so that the device will unlatch. The lower inner corner 292 of either or both of buttons 290 makes contact with angled surface 239, causing pawl 254 to deflect toward the interior of the device as indicated by the arrow.

Figure 6B:
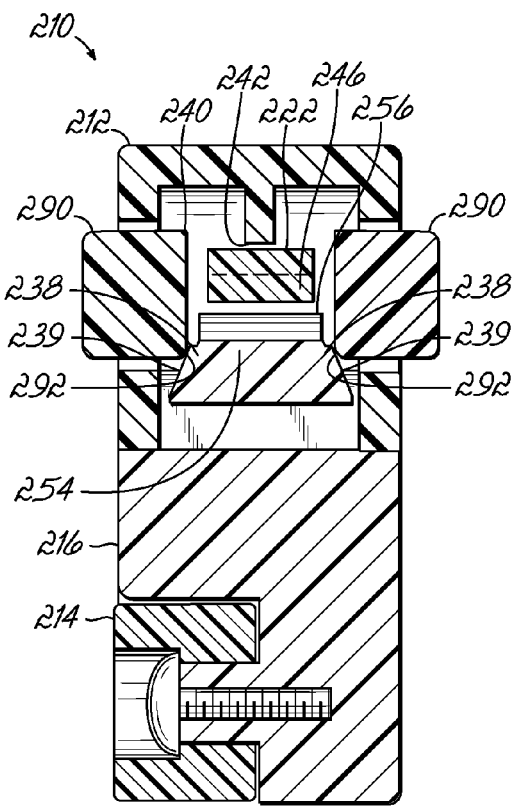
FIG. 6B is the cross section of FIG. 6A after the initial movement for unlatching, as indicated in FIG. 6A, has taken place.

FIG. 6B shows the same cross section as FIG. 6A with the following differences: Buttons 290 have moved towards each other and the pawl 254 and deflecting teeth 256 have moved inwardly and disengaged from teeth 246. The device is ready to be opened by moving the jaw member 214 out of the passageway 240.

Figure 7:
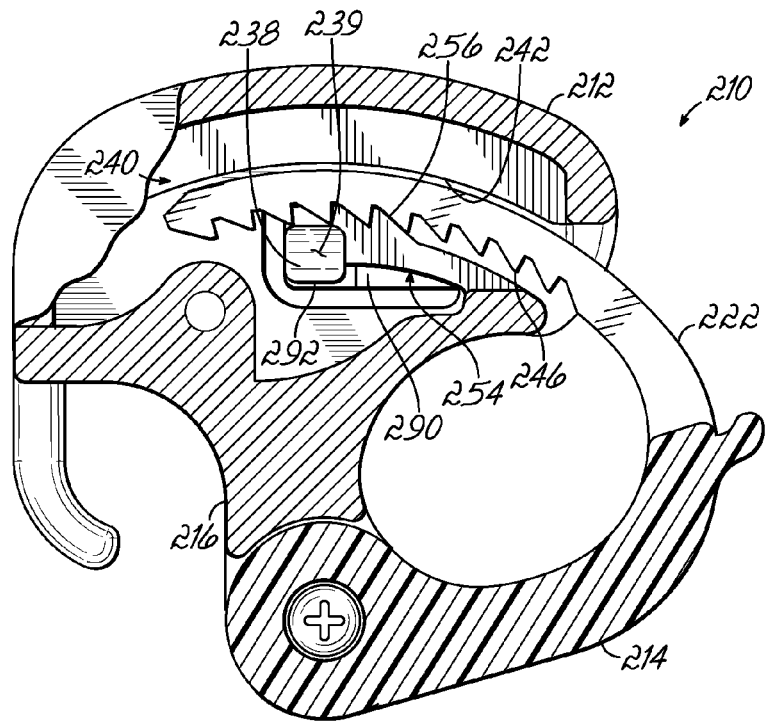
FIG. 7 is an elevational side cut away view of the embodiment of FIG. 4.

FIG. 7 shows a side partial sectional view of the device 210 in the latched position.

Figure 8A:
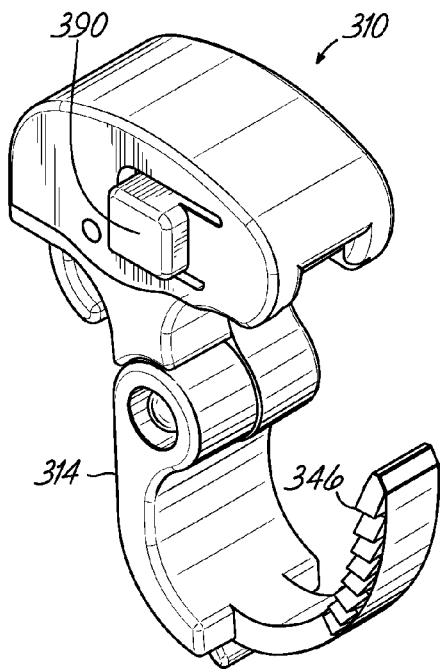
FIG. 8A is a perspective view of an embodiment having side teeth.

FIG. 8A shows yet another embodiment of the invention. A device 310 is shown having a jaw member 314 that has teeth 346 that are disposed on the side of the jaw member rather than on the inward surface as in the other embodiments. A side button 390 is pushed to begin unlatching the device, using internal structures such as those shown in FIGS. 3D and 3E.

Figure 8B:
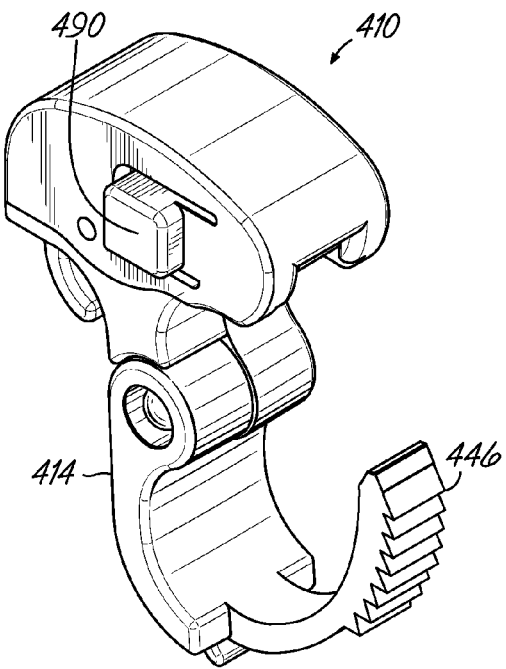
FIG. 8B is a perspective view of an embodiment having outside teeth.

FIG. 8B shows yet another embodiment of the invention. A device 410 is shown having a jaw member 414 that has teeth 446 that are disposed on the outside of the jaw member rather than on the inward surface as in the other embodiments. A side button 490 is pushed to begin unlatching the device, using internal structures such as those shown in FIGS. 6A and 6B.

FIG. 9A shows an embodiment of a size similar to that of FIG. 4, but using two side buttons such as those in the embodiment of FIGS. 4, 5, 6A, 6B and 7. A frame 294 has been added so that a person's fingers could pass through or grip the open area 296 and frame 294 to provide an easy way for a person to carry device 210 and its contents. Frame 294 could be roughened or knurled to assist in gripping. A handle such as the one formed by frame 294 is especially convenient when the size of the device 210 is small, in which case grasping the combination of the device and a bundle could result in accidentally depressing a button 290, causing the device 210 to unlatch. The frame 294 and open area 296 also forms a convenient way to hang a bundle and device combination. For instance, a coiled extension cord, captured by the device 210, could be hung on peg on a garage wall by passing open area 296 over the peg.

FIG. 9B shows an embodiment with two side buttons as in FIG. 9A, in which, instead of a frame 294 creating an open space 296, a gripping wall 298 is provided. Wall 298 may be knurled or roughened to facilitate gripping.

FIG. 9B further illustrates optional wedges 300a, 300b and 300c incorporated into wall 298, used for mounting the device. Wedges may mount the device onto the object to be bundled (such as a headphone or extension cord) or to another cylindrically-shaped item such as a peg in a pegboard. The device may incorporate wedge structures of varying sizes thus allowing the user to select the wedge 300a, 300b, 300c that is sized to accommodate the particular size of cord or tubular structure to attach to the device. The use and operation of wedge structures is disclosed in detail in U.S. Pat. No. 5,774,945, which is hereby incorporated herein in its entirety. By selecting a wedge 300a, 300b, 300c that is slightly smaller than the cord or tubular structure, sufficient friction may be generated to prevent the cord or tubular structure from sliding in the wedge. On the other hand, if such sliding is desired, a wedge that is slightly larger than the cord or tubular structure may be selected.

FIG. 9C shows an embodiment as in FIG. 9A or 9B except that in this case there are two optional walls rather than just one as shown in FIG. 9B. The necessary internal workings for the two buttons are situated between the two walls. The two walls may define therein various wedges such as 300d and 300e illustrated in FIG. 9C. One way of constructing this embodiment is for the jaw member 216 to be able to accommodate a bigger cap 412. The internal workings can include structures extending from the buttons that reach to the pawl, or the pawl can be made larger to extend to the buttons.

FIG. 9D shows a further alternate embodiment 510 having jaw members 514, 516 that are integrally joined by a hinge strap or "living hinge" 526. This integral resilient hinge 526 performs the same alignment function as the screw 26 or cylindrical portion 30 disclosed in the embodiments of earlier figures. The contour at 526 can be of many shapes, and it is a function of the materials, thicknesses and curvatures used for a particular design of clamp 510. Although this hinge strap is only shown in this FIG. 9D, the concept can be used for any of the device embodiments shown.

FIG. 10 shows a method of use for any one of the embodiments such as device 10. Any one of the embodiments can be provided with one or more hooks 62 that could be of a variety of shapes and at a variety of locations either in the interior 11 or elsewhere on the device. This hook could either removably, or permanently, attach the device 10 to an object 64 suitable for bundling. Other embodiments might use a wedge as described above to grip the cord being bundled, or other parts of the object 64. The object 64 shown in FIG. 10 is a set of earbuds and attached cords, as typically used for listening to music from portable audio devices.

FIG. 11 shows another example of an environment of use similar to that shown in FIG. 10. In this example the object 64 is an electrical device, such as a power drill, blow dryer, or extension cord. Any corded device or other device in need of bundling (such as a piece of rope) could be bundled in the manner shown in this drawing.

Figure 12:
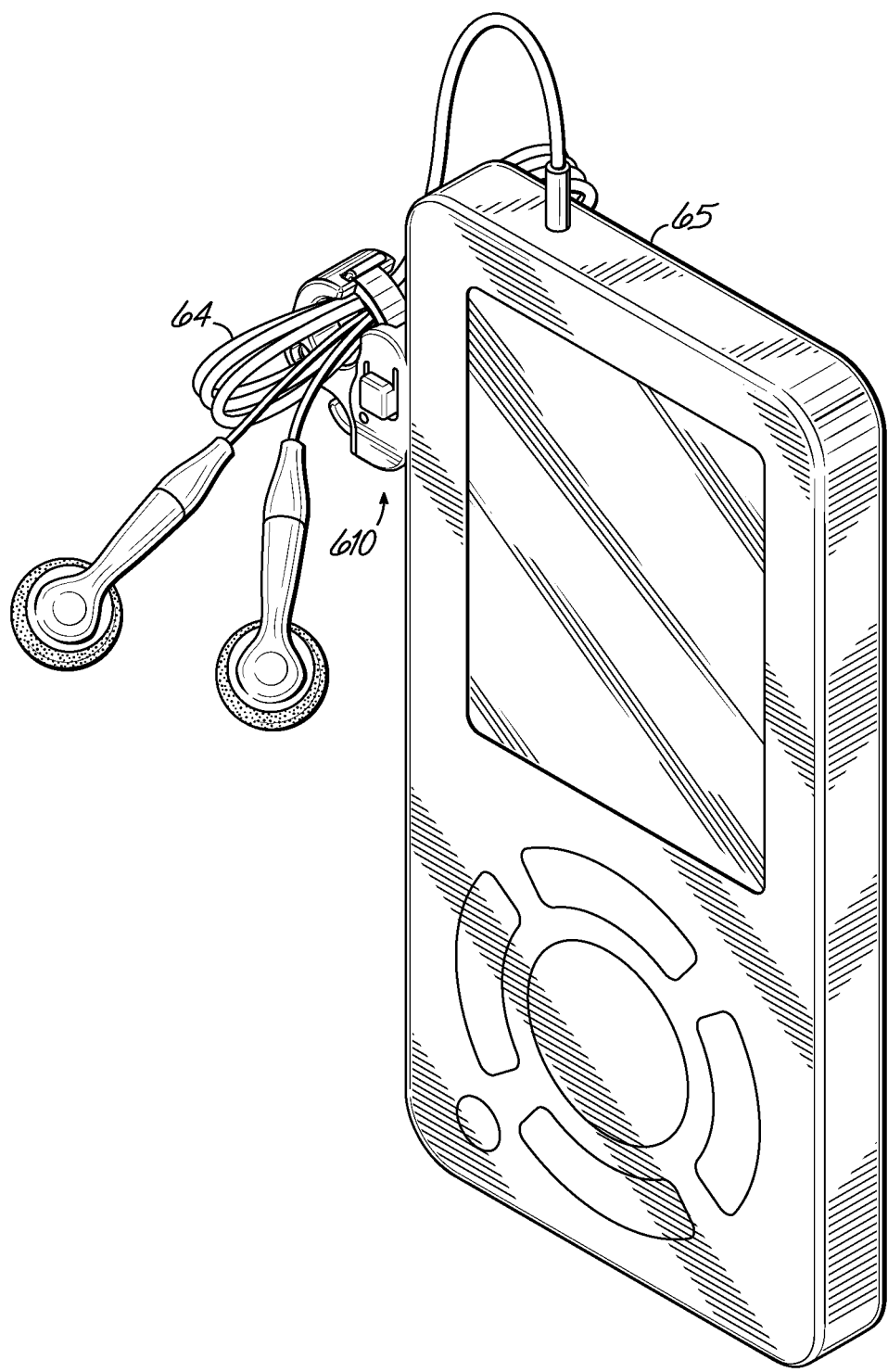
FIGS. 12 and 12A are views of two embodiments that are integrated with a consumer device.

FIG. 12 shows an example of a device 610 permanently or removably attached to an object 65 that uses a cord 64 needing bundling. In this embodiment the device 610 is attached to the object 65 rather than to the cord 64 that needs bundling.

Figure 12A:
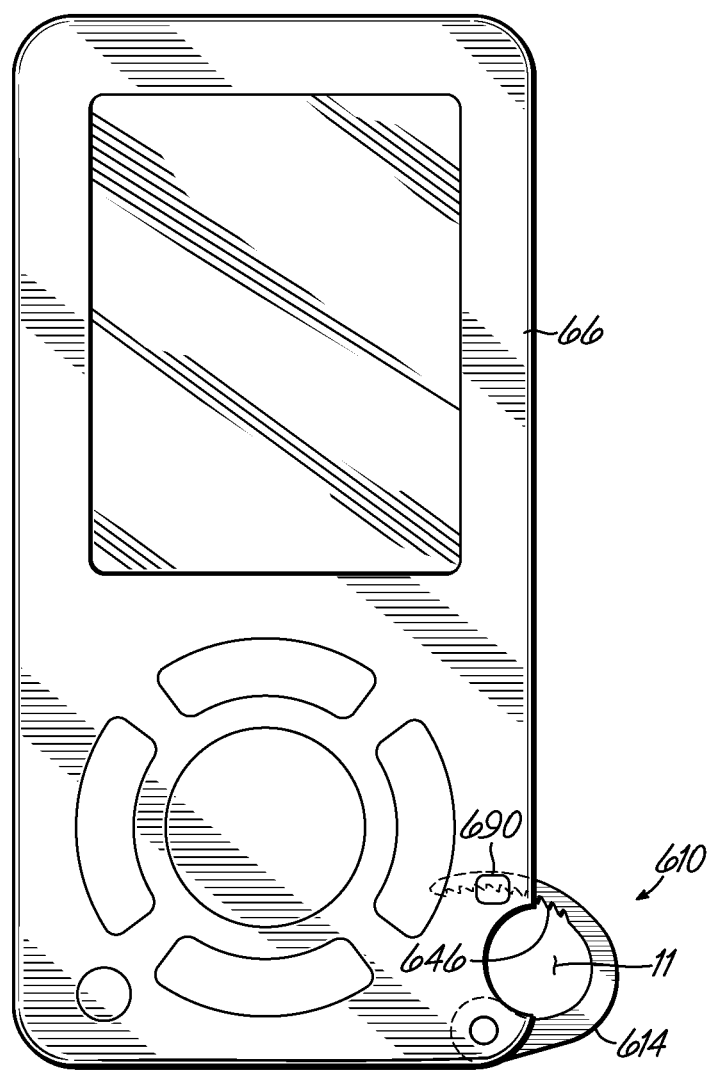

FIG. 12A shows a further embodiment, in which an object 66 incorporates into its structure, a device 610 utilizing principles previously illustrated. Specifically, the device 610 creates a space 11 in which, for example, a cord 64 may be bundled. Whereas previous embodiments, for example the embodiment 210 (FIG. 12) included two jaw members such as 214 and 216, in the present embodiment, only one jaw member 614 may be included. The functional portions, such as the pawl 54 and moving teeth 56 of the jaw member 216 shown in previous embodiments, are incorporated within the body of the object 66. Button 690 is outwardly visible and leads to internal moving parts controlling pawl 54 as discussed with reference to prior embodiments. In FIG. 12A, jaw member 614 has fixed teeth 646 on the inner surface, and button 690 moves a pawl into and out of engagement with teeth 646, similar to button 290 of previous figures. Alternatively, a button such as 190 of FIG. 3A may be used along with side teeth (such as 346 in FIG. 8A). Similarly, teeth on the outer surface of jaw 614 (such as teeth 446 in FIG. 8B) could be used on jaw member 614, with appropriate arrangement of a pawl to interlock with those teeth.

Although FIGS. 12 and 12A show a portable music player that does not have a protective carrying case, in many examples of these portable players, the user may elect to use an exterior case surrounding the device for decorative and/or protective reasons. The principles of this invention, shown in FIGS. 12 and 12A, may be applied to a carrying case as readily as to the object itself; that is, the device 210 may be attached to a case and/or a device 610 may be integrated into a case.

Figure 13A:
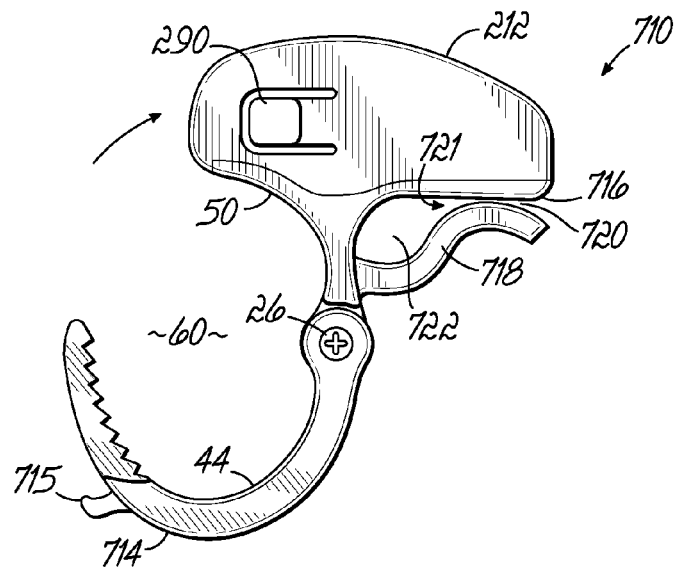
FIGS. 13A-14 illustrate an embodiment having a clip for mounting to an object such as clothing.
Figure 13B:
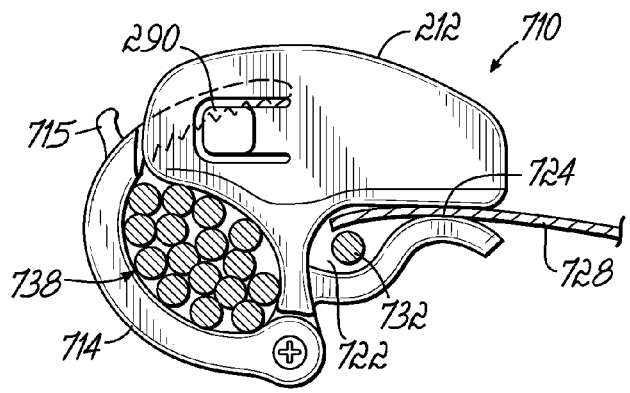
Figure 13C:
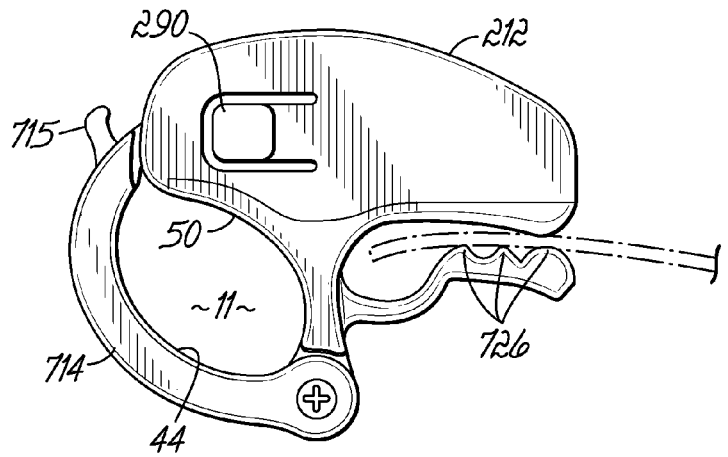
Figure 14:
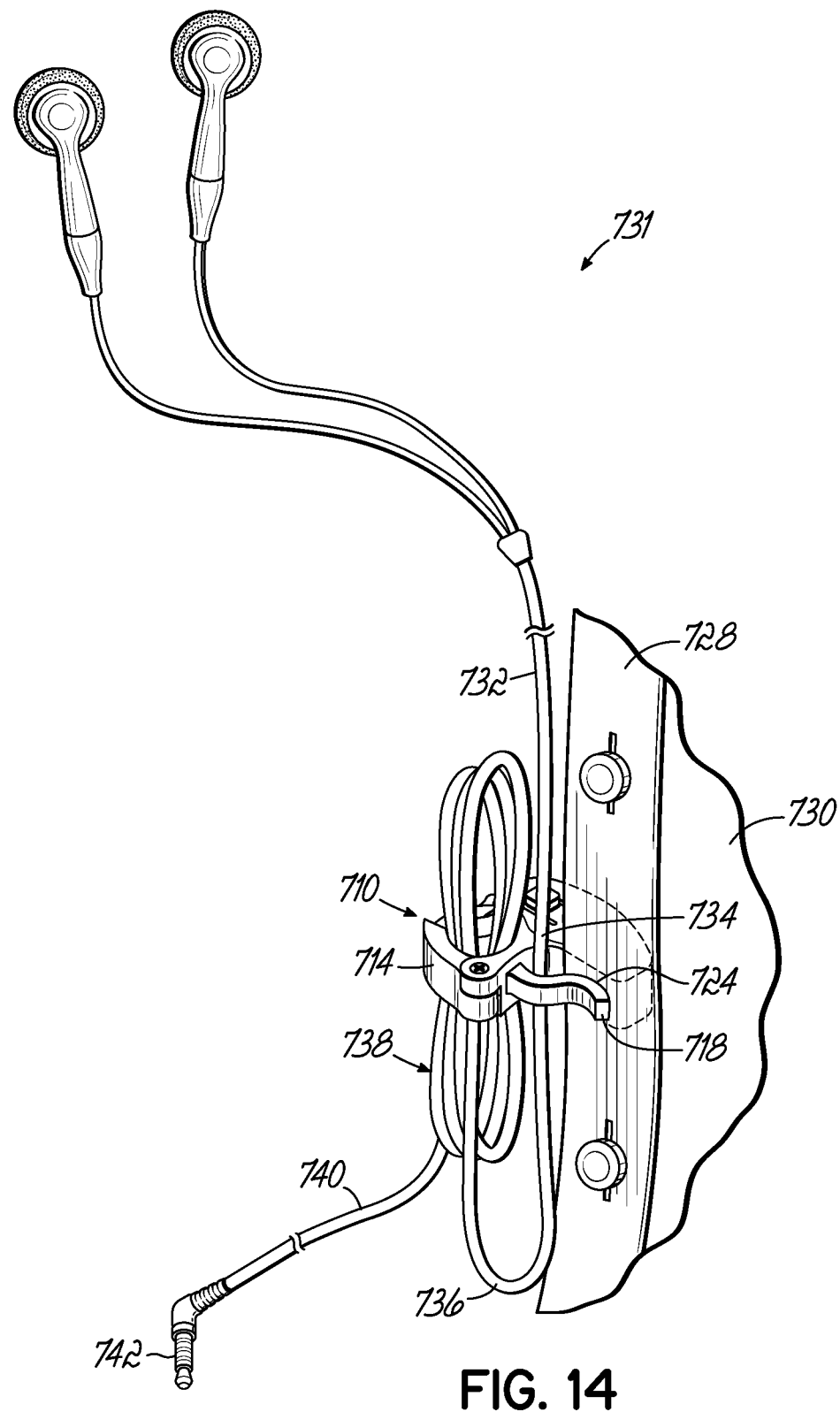

FIGS. 13A-14 show a device 710 having a jaw member 714 with a nub 715 and jaw member 716 with a resilient clip 718 that defines a narrow passage 720 leading to a guide area 722. The clip 718 has a contact surface 724 that may be smooth as in FIG. 13B, or patterned, for example with ridges 726 as in FIG. 13C. The presence of a gap 721 at passage 720 is not a requirement when the clip is not stressed (FIG. 13A). The contact surface 724 may be touching the jaw member 716, or it may not be touching resulting in no gap 721. Regardless, the device 710 will function as described herein. In FIG. 13B, the clip 718 secures device 710 to an object 728. The object 728 may be anything that clip 718 can secure to, for example a purse strap, a curtain, or the front of a shirt 730 (FIG. 14). The ridges 726 resist the tendency of gravity to rotate and pull the device 710 from the object 728.

FIG. 14 illustrates a method of comfortably securing a set of earbuds 731 to a user's shirt 730 or other object using the device 710. An earbud cord 732 has a substantially straight section 734 leading to a loop 736 then a bundle 738 from which a free end 740 leads to an audio playing or other electronic device (not shown). Typically the free end has a plug 742 that is larger than the diameter of the cord 732. A user may use the device 710 with earbuds 731 in a variety of arrangements, other than the one illustrated in FIG. 14. The steps of attaching and bundling the cord 732 may be varied by the user, but one particularly convenient method is as follows: A user (not shown), for example a person wearing the shirt 730, pushes the cord 732 through the passage 720 to the guide area 722 and then moves the passage 720 onto the shirt 730. The user inserts the earbuds into his ears, and places the audio device in a pocket or other location. The user forms the excess cord 732 into the bundle 738, leaving slack to create the loop 736. Then the user places the bundle 738 into the receiving space 60 (FIG. 13A) and closes the device 710 to secure the bundle 738 in the interior area 11. The user may open the device 710 creating the receiving space 60 at any time, from before beginning until the time at which the bundle 738 is ready to be placed in the receiving space 60. In use, the loop 736 provides slack in the cord 732 so that the user's head movements may pull cord 732 through guide area 722, shortening the loop 736 without imparting a significant force on the bundle 738, device 710, or the audio player. The cord 732, bundled and organized next to the user's shirt, is unlikely to become entangled in any other objects for example a door knob, as it would if the cord 732 were dangling loosely.

When the user wishes to remove the earbuds, or make adjustments such as when putting on a hat, he disengages the deflecting teeth 56 (FIG. 2B) from the fixed teeth 46 by pushing one or both buttons 290 and pulls the nub 715 to swing open the jaw member 714 from the jaw member 716 to separate the retaining surfaces 44 and 50. This loosens the grip on bundle 738 so that some of cord 732 may be added or removed from bundle 738 for adjustment purposes. Alternatively, all of bundle 738 may be removed, and cord 732 removed from clip 718 leaving the clip secured to shirt 730.

Another method of removing the audio device is to remove clip 718 from the shirt 730, resulting in device 710 remaining secured to the cord 732 by the retaining surfaces 44 and 50. If gap 721 is small, clip 718 will also secure the device 710 to the cord 732, although it may not be held strongly. When removed by this method, and subsequently stored without disengaging deflecting teeth 56 from fixed teeth 46, the same user may use the audio device a next time by simply clipping device 710 to their shirt, without any need for bundling and adjusting the length of cord 732.

In another embodiment contemplated but not illustrated, guide area 722 may be separate from the clip 718. For example, guide area 722 may be an aperture in either jaw member 714 or 716 sized so that it is larger than the cord 732 but smaller than other objects on the cord, for example the ear pieces and the plug 742. Or the guide area may be formed by a separate closed loop appendage (not shown). Such an embodiment would be installed on cord 732 during earbud set 731 manufacture, for example prior to securing plug 742. Thus another embodiment of the invention is an earbud set 731 that includes device 710.

Figure 15B:
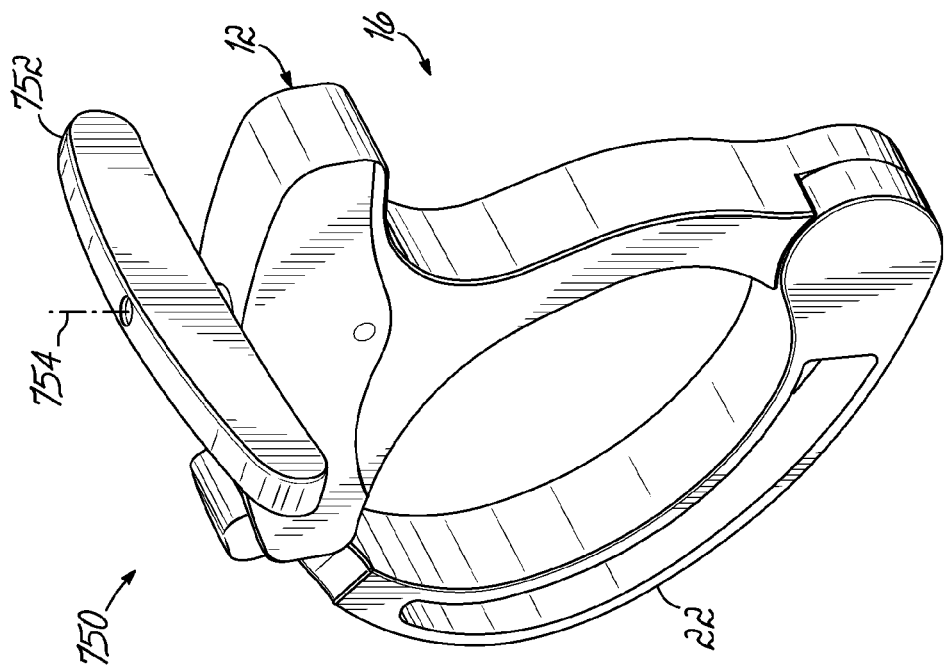
FIGS. 15A and 15B illustrate two positions of an embodiment having a swivel carrying handle.
Figure 15A:
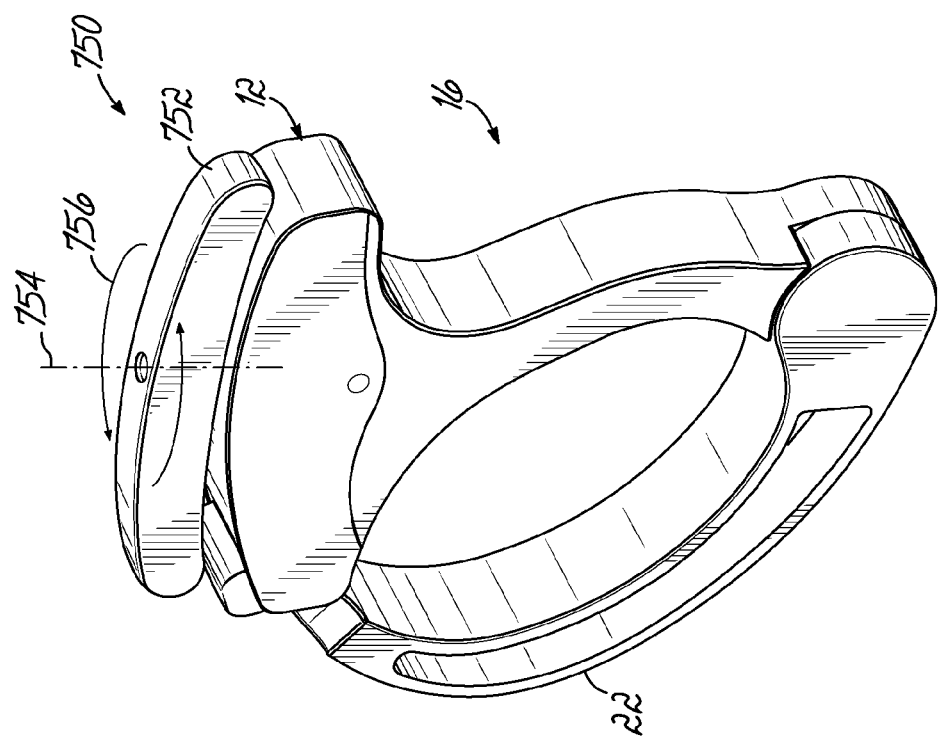

FIGS. 15A and 15B illustrate an embodiment of a device 750. Previously described embodiments were generally planar, making them easily packaged when interior 11 (FIG. 1) is empty. None the less, a person carrying a device that is clamped around a relatively bulky and/or heavy object 64 (FIG. 19), for example a long extension cord or many pieces of pipe, may prefer a device having a carrying handle that is not planar to the jaw members. For example, they may prefer a handle to protrude at ninety degrees (FIG. 15B) from the plane of the jaw members. But such a ninety degree device, or a device of another angle, would require different packaging than a planar device requires. Further, a person may prefer an angle other than ninety degrees, and may want to vary the angle. To this end, a handle 752 is coupled to a jaw member or cap of any of the previous embodiments, to allow the device 750 to be selectively planar (FIG. 15A) and non-planar (FIG. 15B). The handle 752 is rotatable around axis 754 as indicated by arrows 756.

Figure 16B:
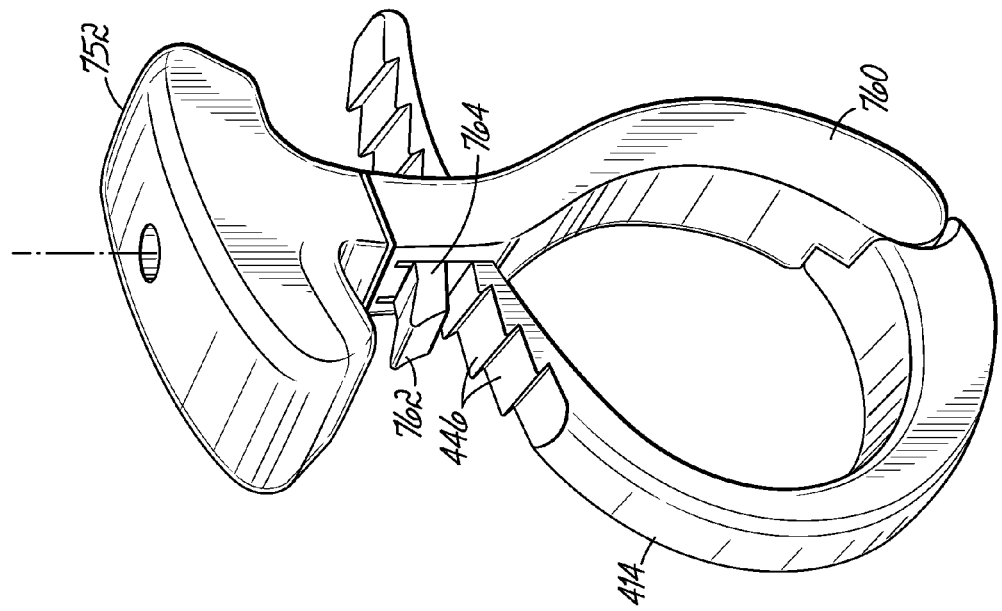
FIGS. 16A and 16B illustrate two positions of a second embodiment having a swivel carrying handle.
Figure 16A:
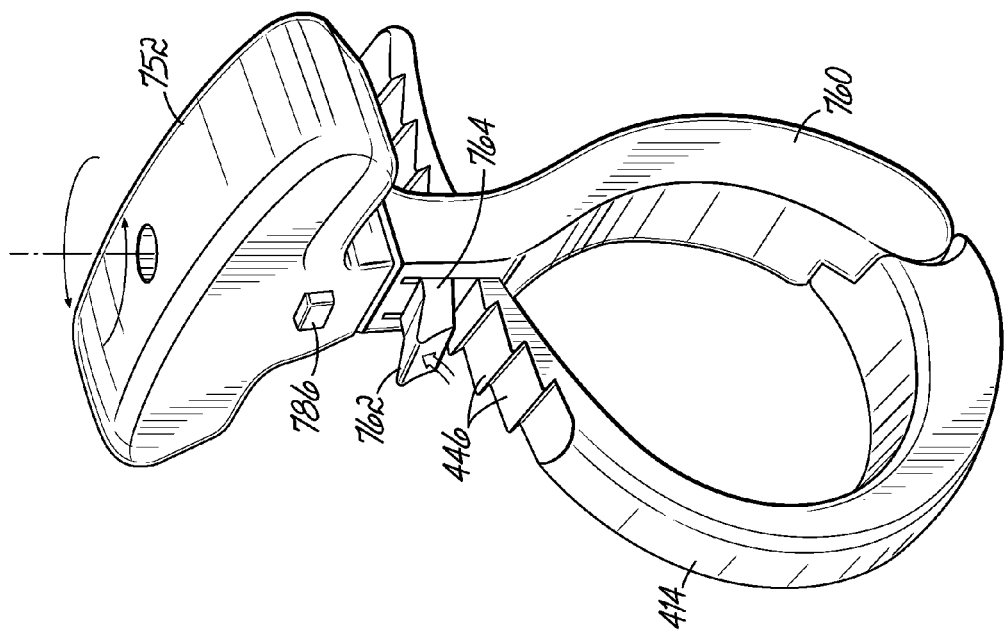
Figure 17:
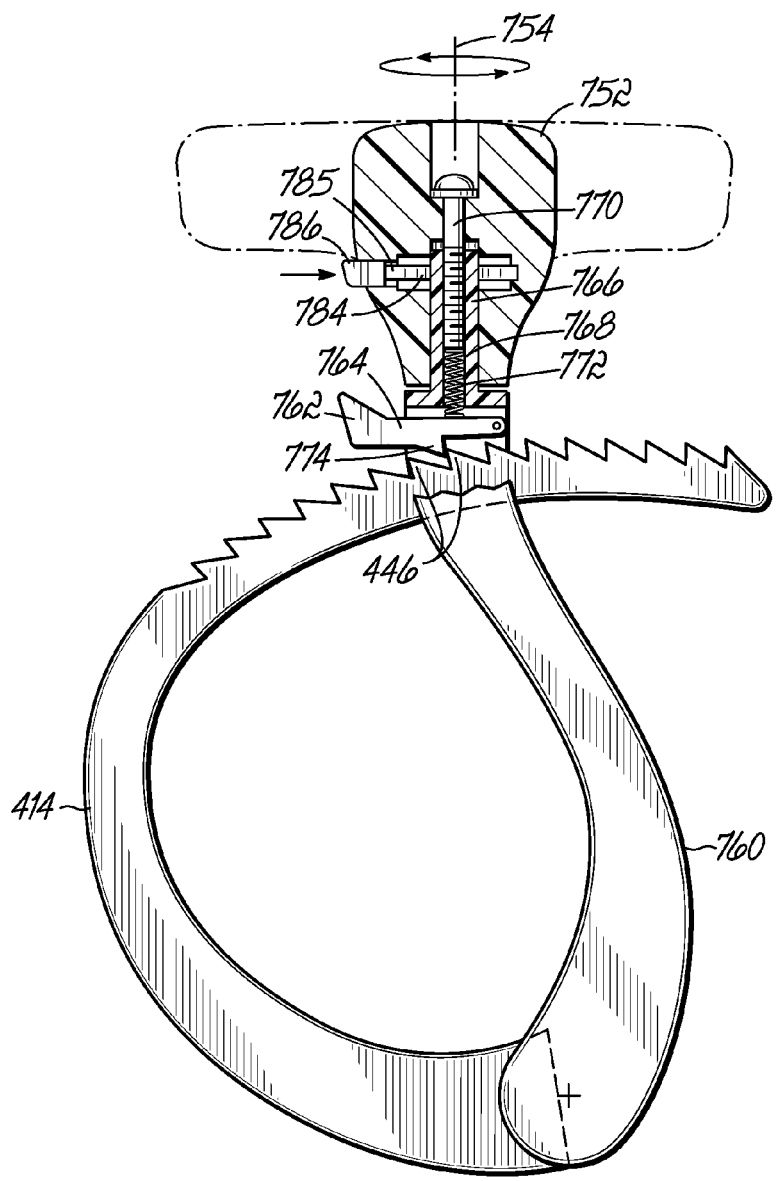
FIG. 17 is a partial cut away of the embodiment of FIGS. 16A and 16B.
Figure 17A:
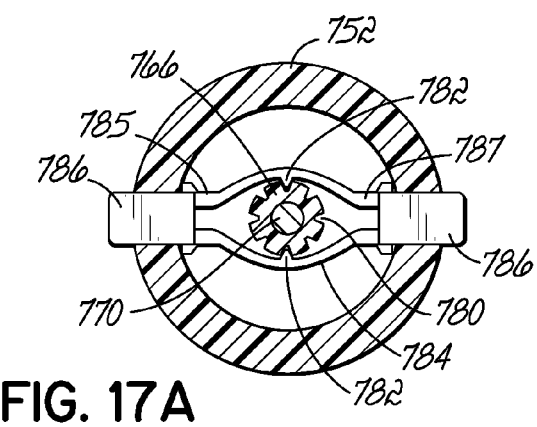
FIGS. 17A and 17B are transverse sectional views of the handle 750 of FIG. 17, illustrating an alternative embodiment with a dual push button release mechanism.
Figure 17B:
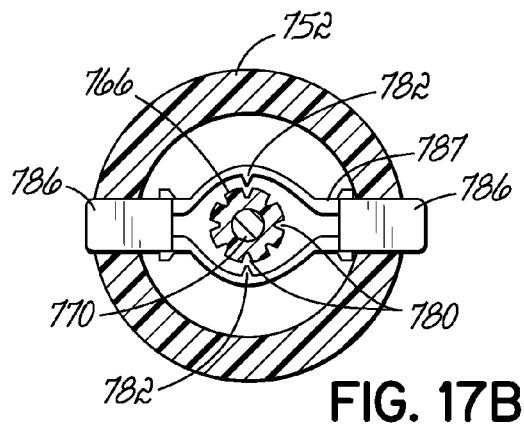

FIGS. 16A-17 illustrate the rotatable handle 752 coupled to a jaw member 760 having a button 762 on a pawl 764 that is arranged with outward facing teeth 446 as previously described with reference to FIG. 8B. As best seen in FIG. 17, jaw member 760 has shaft 766 with a hole 768 that receives a threaded fastener 770. The fastener compresses a spring 772 that rests on and biases the pawl 764 so that at least one deflecting tooth 774 engages at least one tooth 446. The fastener 770 also secures the handle 752 to the shaft 766 without clamping them together, thus the handle 752 is free to rotate around the fastener 770. The shaft has a plurality of grooves 780 sized to receive prongs 782 on a bi-winged leaf spring 784 that is inside the handle 752. In the illustrated embodiment eight grooves 780 allow the handle 752 to be positioned at forty-five degree increments relative to axis 754. Leaf spring 784 is supported on both its ends. At a first end 785 (FIG. 17) is a button 786 that may be pushed to spread the leaves apart disengaging the prongs 782 from the grooves 780 and allowing rotation of the handle 752. In an alternate embodiment, FIGS. 17A and 17B illustrate a button 786 on the first end 785 and a second button 786 on a second leaf spring end 787. There are other arrangements of springs, grooves, detents, and clamping or sliding surfaces between the handle 752 and the jaw member 760 that one skilled in the art may arrange. The illustrated embodiment is not meant to be limiting.

Figure 18:
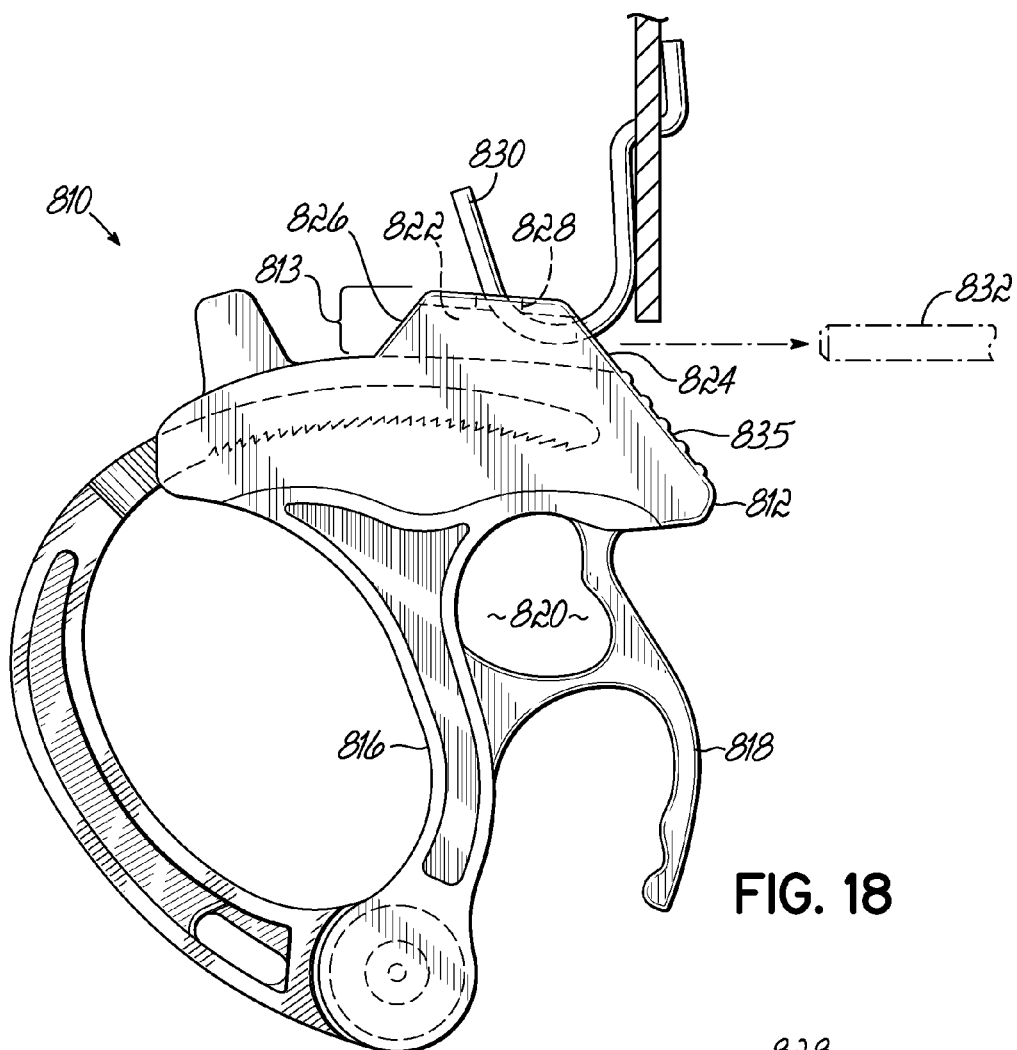
FIGS. 18 and 18A illustrate an embodiment having a fixed mount.
Figure 18A:
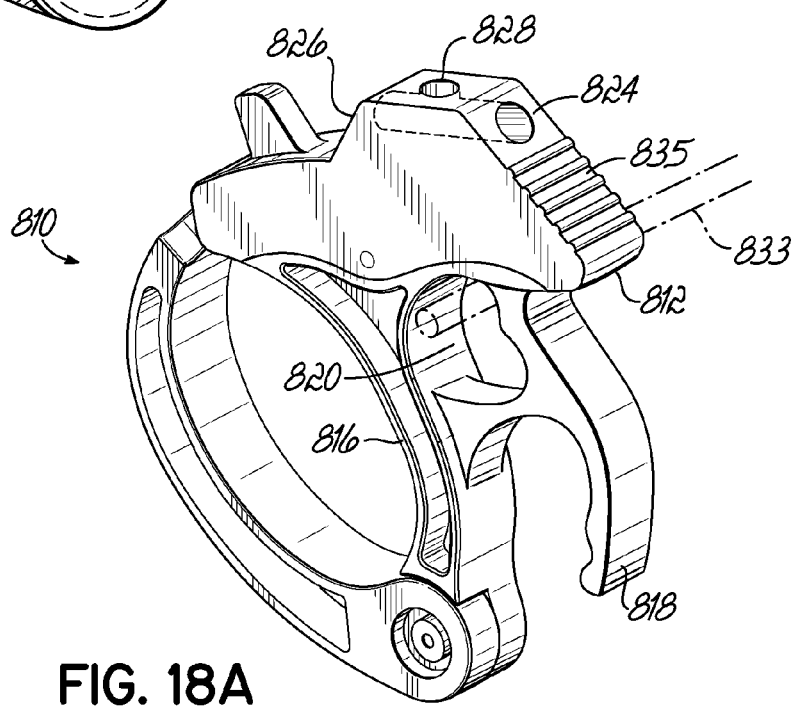

FIGS. 18 and 18A illustrate a device 810 having a cap 812 and a mount support 813. The cap 812 is fastened to jaw member 816 having a handle 818 and a bi-lobed finger hole 820. The mount support 813 has a hole 822 from a front opening 824 to a back opening 826. A top opening 828 intersects the hole 822. In use, a curved peg or hook 830 can pass through either of the openings 824 or 826, and out the top opening 828. Or instead, a straight peg 832 can pass though the hole 822 from the front opening 824 and the back opening 826, or vice versa, in a direction generally planar with the device 810. Bi-lobed finger hole 820, is adapted to receive any of a hook 830, straight peg 832, and peg 833 at a right angle to the plane of the device 810, and the bi-lobes allow the device 810 to rest at two different angles. Further bilobe hole 820, handle 818, and a thumb rest 835 allow comfortable lifting of a loaded device 810 onto a peg or hook. Typically a user places a thumb on thumb rest 835, a forefinger in the bilobe hole 820, and the rest of the hand on handle 818.

Figure 19:
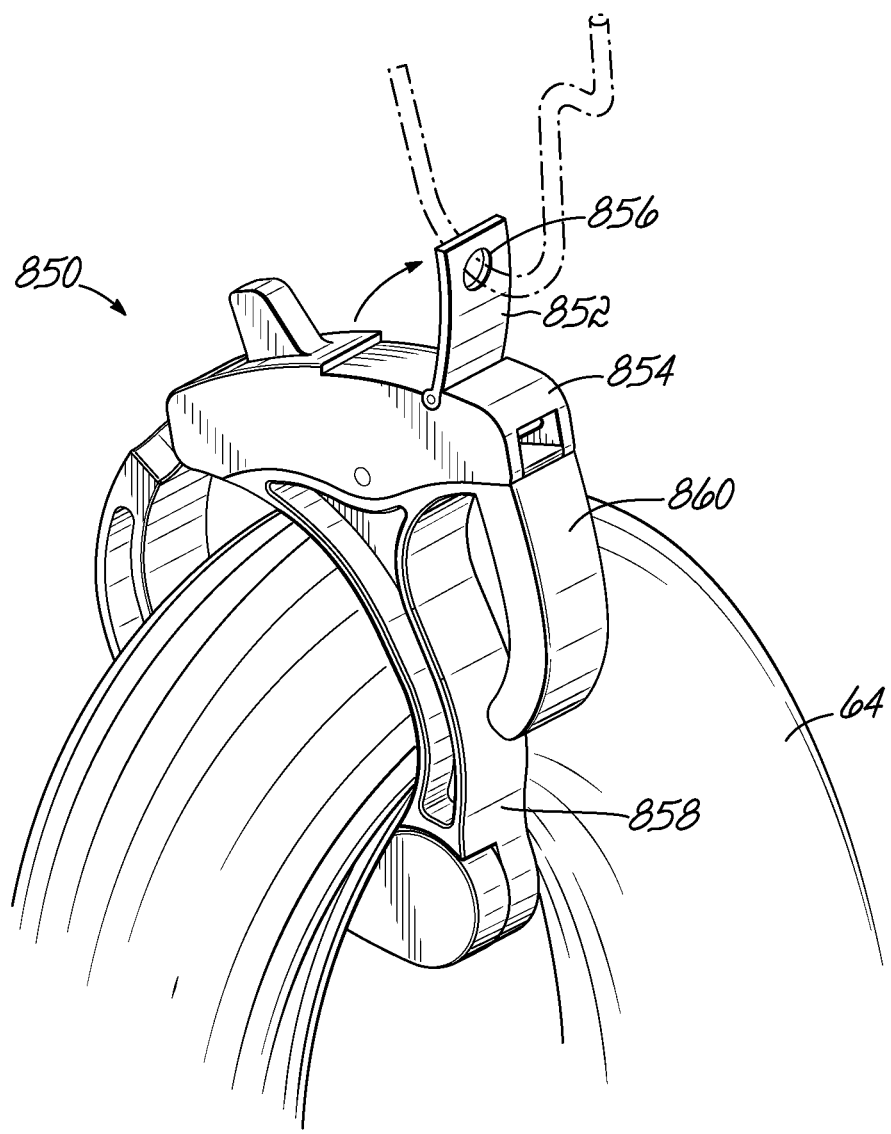
FIG. 19 illustrates an embodiment having a hinged mount in an extended position.

FIG. 19 illustrates an embodiment 850. Device 850 has a mount 852 hinged from a cap 854. The mount has an aperture 856 that may be used for any of the hook 830, straight peg 832, or peg 833. A jaw member 858 includes an open handle 860.

As seen in FIGS. 20A and 20B, a handle 862 may be made detachable, for example by having a T-slot 864 in the jaw member 16. By making the handle detachable, a common manufacturing process may be used to make the planar jaw members with a common T-slot, and a wide variety of arms may be provided to install in the T-slot depending on customer preference.

Figure 21:
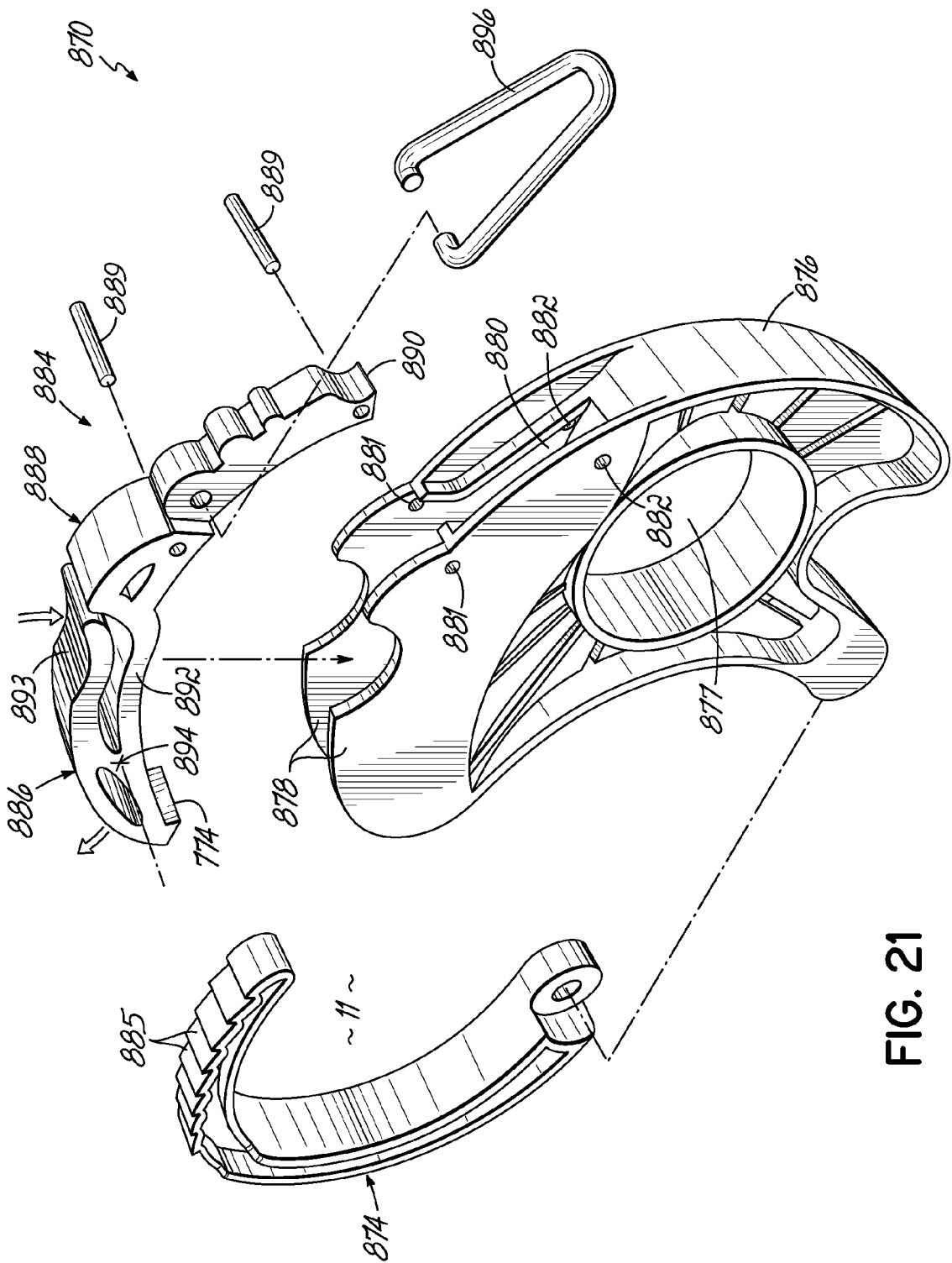
FIG. 21 is a partially exploded perspective view illustrating an embodiment having a trigger assembly and a different form of a hinged mount.

FIG. 21 illustrates a device 870 having a first jaw member 874 with teeth 885 and a second jaw member 876 with an aperture 877 and trigger frame 878. In the trigger frame is a tongue groove 880 a pair of forward holes 881 and rear holes 882. A trigger assembly 884 has a pawl portion 886 and an anchor portion 888. Fasteners in the form of pins 889 pass through the holes 881 and 882 and holes in the trigger assembly to fasten the anchor portion 888 in the tongue groove 880. Although fastener 889 is illustrated as two metal pins, any form of fastener or fastening would do. For example screws, gluing, thermal bonding or ultrasonic welding. It is important to understand that anchor portion 888 remains stationary relative to the trigger frame 878.

Another alternative form of fastening may have anchor portion 888 shaped as a tongue that locks into tongue groove 880. To that end, a tongue lock 890 is on the end of the anchor portion 888 so that the trigger assembly 884 locks into the jaw member 876. This locking, which may be enhanced by adhesives, bonding, or the like, may be used instead of or in addition to the two pins 889, a single pin 889, or any fastener 889, as long as trigger assembly 884 is secured by anchor portion 888 to jaw member 876.

Pawl portion 886 is connected to anchor portion 888 by a flexor 892, and has a release button 893. It can be seen that depressing release button 893 in the direction of the arrow will cause the pawl portion 886 to rotate around a fulcrum point 894 (represented approximately in the figure) so that flexing tooth 774 will move as indicated by the second arrow. These two arrows illustrate the motion during unlatching of jaw members 874 and 876.

In embodiment 870 it is evident that trigger assembly 884 may be molded separately and therefore be a different material, if desired, than the jaw members 874 and 876. This is advantageous in that optimal materials may be selected for the trigger assembly 884 and the jaw members 874, 876. For example, the trigger assembly, needing to flex repeatedly, may be made of polycarbonate and the jaw members made of ABS. Often, polycarbonate is more expensive than ABS, so embodiment 870 reduces the cost for plastic as compared to, for example, a similar sized jaw member 16 having an integral pawl 54 (FIG. 2) that is made from all polycarbonate. Polycarbonate and ABS are use as typical examples of suitable materials, however other materials, including high impact ABS where needed, will be apparent to one skilled in the art and are included within the scope of the present invention.

Figure 23:
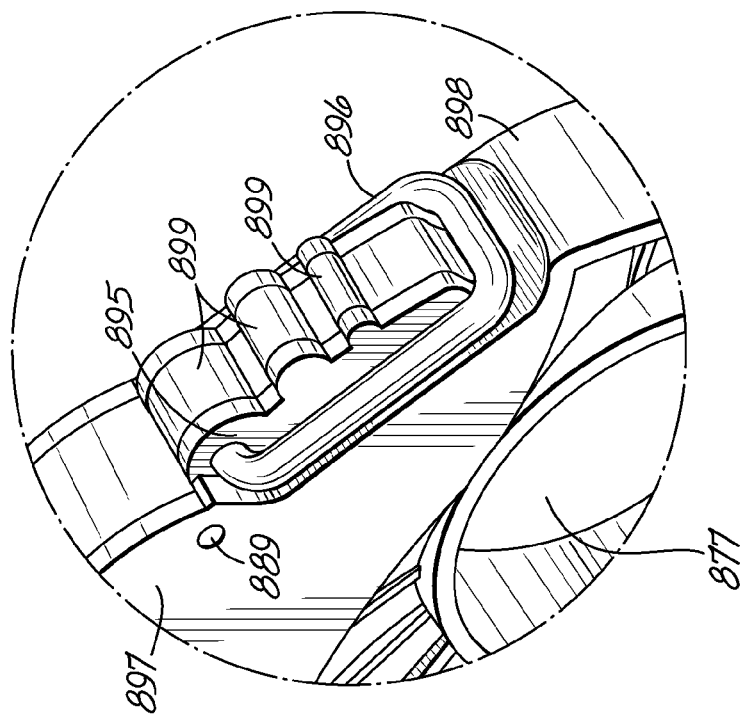
FIG. 23 is an alternate embodiment of FIG. 22, detail view only, and with the hinge mount in its retracted position.
Figure 22:
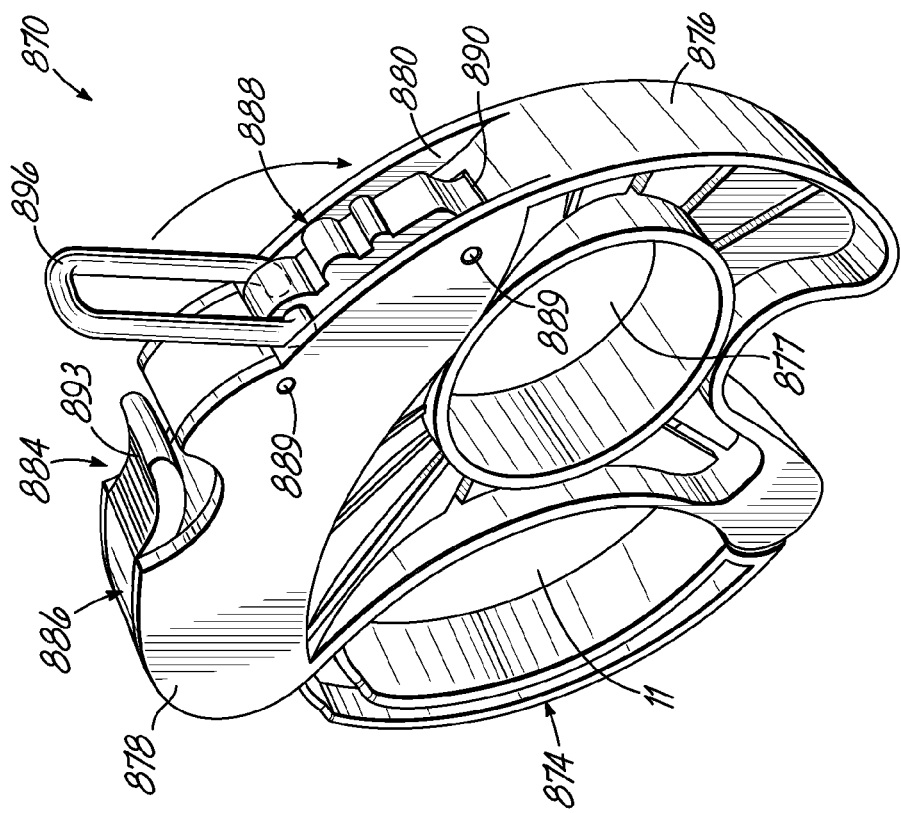
FIG. 22 is the embodiment of FIG. 21 in an assembled and closed position, and the hinge mount in an extended position.
Figure 24A:
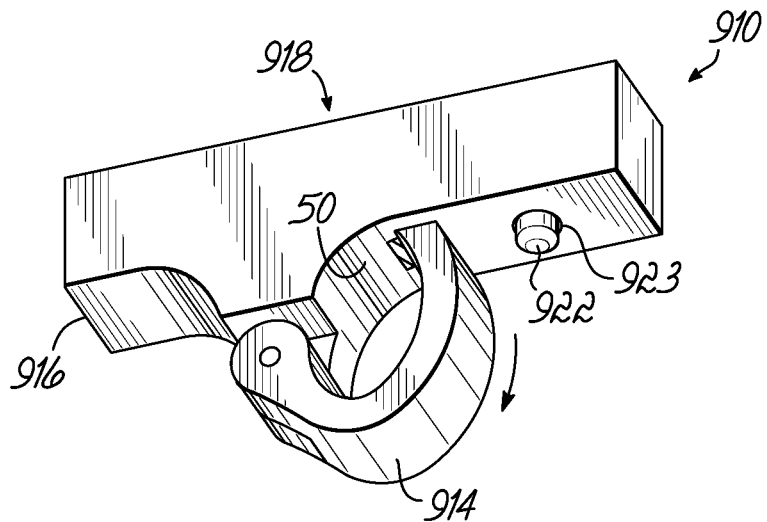
FIGS. 24A-25B illustrate an embodiment mountable to a flat surface
Figure 24B:
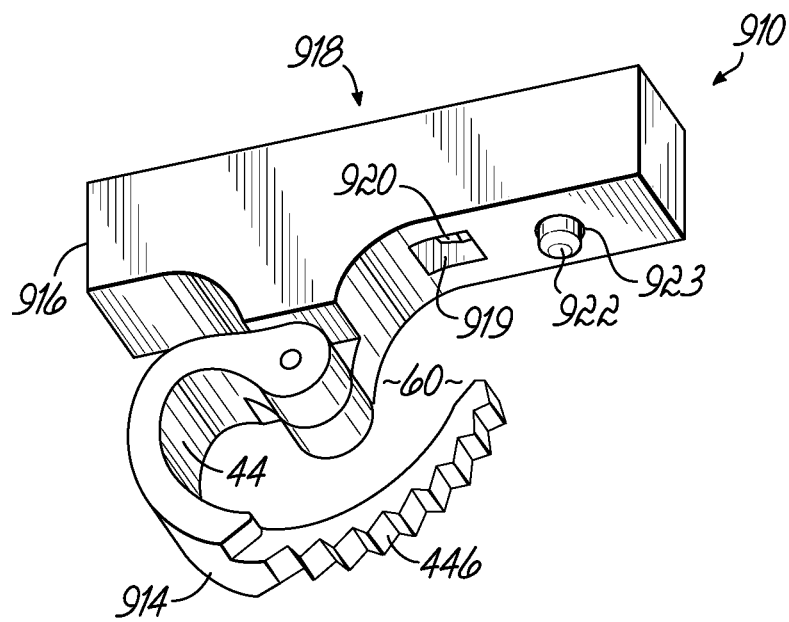

With reference to FIGS. 22 and 23, additional features of the device 870 are described. Aperture 877 may be used for fingers when carrying a bundled object, or used for hanging in a similar way as shown with hole 820 (FIG. 18A). D-ring 896 may be flipped into position and used in a similar way to mount 852 and aperture 856 (FIG. 19). Additionally, holes or apertures 820, 877, 856, and D-ring 896 may be used to enhance merchandising, as will be explained:

When merchandising devices such as these, both adequate display space and adequate shipping space may be problems. By advantageously having holes 820,877 positioned at a right angle to hole 856 or D-ring 896, devices may be displayed in at least two orientations. And, this is accomplished without increasing the thickness of the overall device as compared to a device that does not have the hinge mount or D-ring along with the apertures 820, 877. For example, merchandising may be done by having many devices on a single peg 832 (FIG. 18) or they may be strung along a single wire or peg 833 (FIG. 18A) or positioned next to each other on a close-packed array of many hooks 830 (FIG. 18).

FIGS. 22 and 23 illustrate alternative designs of the trigger assembly 884 to trigger frame 878 interface. As is apparent in exploded FIG. 21, the D-ring is a split configuration to make it easier to assemble than a closed/welded configuration. However, with any split D-ring design, there is concern that the D-ring may open up and release from the hole through which it passes. In FIG. 22, the sides of the trigger frame 878 surround the D-ring 896 and prevent spreading of the D-ring. Also in the embodiment of FIG. 22 the weight of an object (not shown) in interior 11 is transmitted to a wall peg/D-ring interface via the pins 889 that hold the jaw member 876 to the trigger assembly 884. However, when considering an anchor portion 888 design that only has a tongue and groove and no fastener, or a hybrid design having only one pin 889 as in FIG. 23, it may be less desirable to carry the load through the pin 889 or an un-pinned connection. To that end FIG. 23 illustrates the D-ring passing though a recessed portion of a trigger frame 897 on a jaw member 898. The choice of a configuration of D-ring and D-ring connection is dependent on many factors, for example materials, distance from holes to edges, wall thickness, molding processes, and other factors that would be apparent to one skilled in the art.

The trigger assembly 884 further has three ridges 899 for comfort and to enhance a person's grip. When a person wraps their hand over the top of the device 870 while carrying a load, the ridges 899 typically rest against the palm of the hand. During opening of the device, the ridges 899 also provide surfaces for the palm or fingers to push against. The ridges 899 are an example of one configuration that may be used in this area. Other configurations may be used, or the surface may be simply smooth.

FIGS. 24A-25B illustrate an embodiment 910 of a hand cuff like element adapted to be mounted to a flat surface. Device 910 may be conveniently used to organize cords routed across a flat surface, for example a desk or a ceiling. Device 910 has a jaw member 914 and a jaw member 916 with a generally flat face 918. Jaw 914 enters a passage 919 to engage tooth 920. A button 922 in hole 923, when pushed, releases jaw 914 so that it can be removed from the passage 919.

Figure 25A:
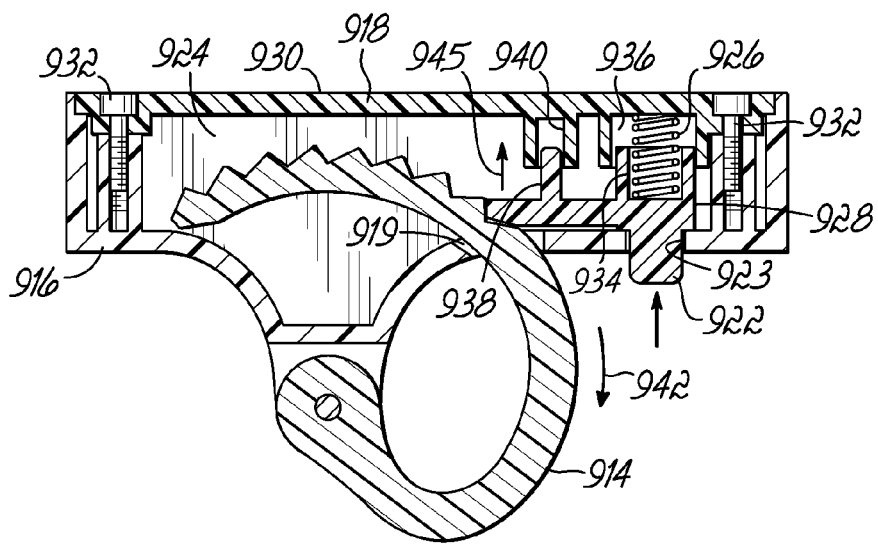
Figure 25B:
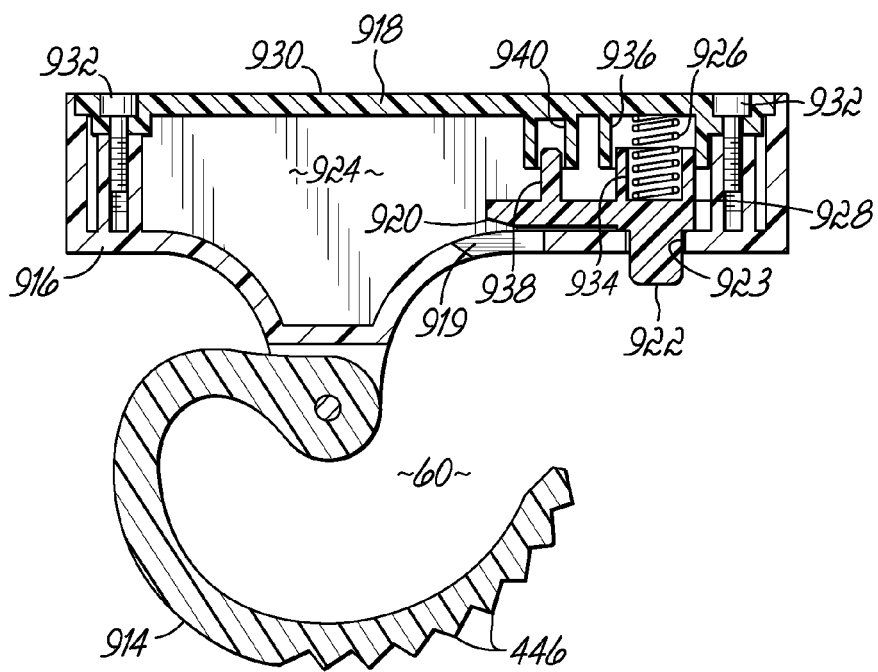

With reference to FIGS. 25A and 25B, the jaw 916 has a cavity 924 that receives a spring 926, a pawl 928 having the tooth 920, and a base 930 that is secured within the cavity by fasteners 932. The pawl 928 has a spring bore 934 that captures spring 926, and slidably locates in a spring guide 936 in the base. The pawl also has a guide 938 captured by a channel 940 of the base. At least one of hole 923, guide 936 and guide 938 receive a load force (not shown) transmitted when jaw member 914 is pulled in the direction of arrow 942 (FIG. 25A). Further, hole 923, guide 936 and guide 938 ensure that pawl 928 remains substantially parallel to surface 918, so that the deflecting tooth 920 on the pawl 928 pulls cleanly away from the fixed teeth 446 on jaw member 914 as indicated by arrow 945.

Figure 26:
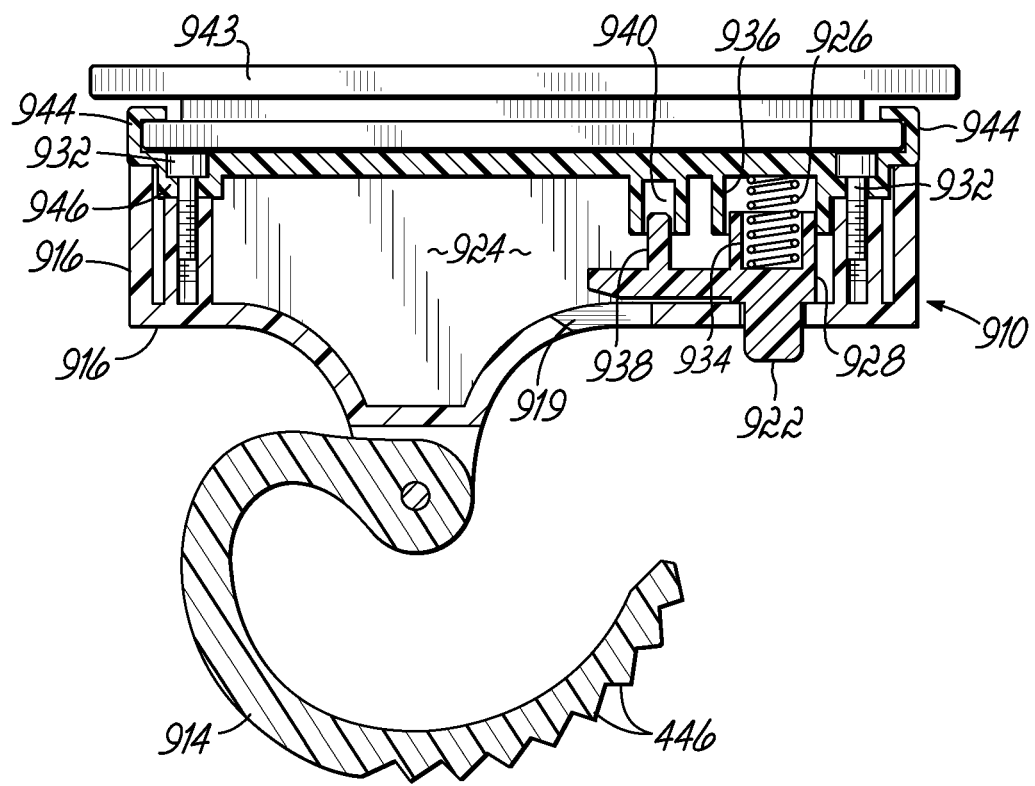
FIG. 26 illustrates an embodiment mountable to a support rail.

FIG. 26 illustrates a rail 943 and a mating rail channel 944 associated with embodiment 910. This rail 943 may be unique to embodiment 910, or it may be a rail that is in wide use, for example in racks housing servers in data facilities. The rail channel 944 is attached to the base 930 (FIG. 25A) under fasteners 932, or the rail channel 944 may be molded integral with the base. Advantageously, various bases may be manufactured allowing device 910 to be customized according to a customer preference without changing other components. In other words, a customer may order versions of 910 having rail channels 944 that will slide on the rails 943 in use at the customer's facility.

In use, wires or other objects 64 requiring holding are placed in receiving area 60. If device 910 is positioned with flat surface 918, upwards as in FIG. 25B, the curvature of jaw member 914 allows wires to be placed in the device 910 one at a time, without falling out of the device 910. This is advantageous when running wires on a route having many devices 910. All the devices 910 may be left open simultaneously, and then all closed when the routing task is complete.

While the present invention has been illustrated by the description of one or more embodiments thereof, and while the embodiments have been described in considerable detail, they are not intended to restrict or in any way limit the scope of the appended claims to such detail. Many of the features illustrated with respect to one embodiment are able to be combined with features illustrated in other embodiments. Additional advantages and modifications will readily appear to those skilled in the art. The invention in its broader aspects is therefore not limited to the specific details, representative apparatus and method and illustrative examples shown and described. Accordingly, departures may be made from such details without departing from the general inventive concept.

What is claimed is:

1. A device for handling or storing one or more items, comprising:
   a pair of generally rigid first and second jaw members each having a hinge end and an outer end, each jaw member including an inner surface and an outer surface, the jaw members being connected together at their hinge ends, such that the jaw members (i) have a first, open position in which the outer ends are spaced apart to define a receiving space and the inner surfaces are generally not facing one another, (ii) have a plurality of second, closed positions in which the outer ends are nearer to one another, and (iii) are self aligned such that the outer ends automatically engage one another upon applying pressure upon an outer surface,
   an engagement device coupled to the outer end of the first jaw member, positioned to engage to the outer surface of the second jaw member, the engagement device made of a first material in a unitary piece comprising a pawl portion engageable to the outer surface of the second jaw member, a beam portion, and an anchor portion, the anchor portion being coupled to the outer end of the first jaw member and the pawl portion being resiliently moveable relative to the anchor portion and first jaw member, wherein said pawl portion includes a release member that is moveable toward the hinge ends of the jaw members to move the pawl portion from an engaging to a disengaged position by resilient flexing of the beam portion,
   wherein the first jaw and the second jaw are made of material different from the first material, and the first material constitutes less than 20 percent by weight of the device.

2. The device of claim 1 wherein the first material is plastic polycarbonate.

3. The device of claim 1 further comprising fasteners to couple the engagement portion to the first jaw member.

4. The device of claim 1 further comprising a D-ring for supporting the device from a projection.

5. The device of claim 1 further comprising a handle.

6. A device for handling or storing one or more items, comprising:
   a pair of generally rigid first and second jaw members each having a hinge end and an outer end, each jaw member including an inner surface and an outer surface, the jaw members being connected together at their hinge ends, such that the jaw members (i) have a first, open position in which the outer ends are spaced apart to define a receiving space and the inner surfaces are generally not facing one another, (ii) have a plurality of second, closed positions in which the outer ends are nearer to one another, and (iii) are self aligned such that the outer ends automatically engage one another upon applying pressure upon an outer surface,
   an engagement device coupled to the outer end of the first jaw member, positioned to engage to the outer surface of the second jaw member, the engagement device made of a first material in a unitary piece comprising a pawl portion engageable to the outer surface of the second jaw member, a beam portion, and an anchor portion, the anchor portion being coupled to the outer end of the first jaw member and the pawl portion being resiliently moveable relative to the anchor portion and first jaw member, wherein said pawl portion includes a release member that is moveable toward the hinge ends of the jaw members to move the pawl portion from an engaging to a disengaged position by resilient flexing of the beam portion, and
   fasteners to couple the engagement portion to the first jaw member, wherein the fasteners comprise at least one pin.

7. The device of claim 6 wherein the first material is plastic polycarbonate.

8. The device of claim 6 further comprising a D-ring for supporting the device from a projection.

9. The device of claim 6 further comprising a handle.

* * * * *